United States Patent
Lee et al.

(10) Patent No.: US 11,082,849 B2
(45) Date of Patent: Aug. 3, 2021

(54) VALIDATING AUTHORIZATION FOR USE OF A SET OF FEATURES OF A DEVICE

(71) Applicant: QUALCOMM Incorporated, San Diego, CA (US)

(72) Inventors: Soo Bum Lee, San Diego, CA (US); Gavin Bernard Horn, La Jolla, CA (US); John Smee, San Diego, CA (US); Rajesh Pankaj, San Diego, CA (US); Thomas Rouse, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 15/082,919

(22) Filed: Mar. 28, 2016

(65) Prior Publication Data

US 2017/0041794 A1     Feb. 9, 2017

Related U.S. Application Data

(60) Provisional application No. 62/202,664, filed on Aug. 7, 2015.

(51) Int. Cl.
*H04L 9/32* (2006.01)
*H04W 12/08* (2021.01)
(Continued)

(52) U.S. Cl.
CPC ........... *H04W 12/08* (2013.01); *H04W 12/06* (2013.01); *H04W 12/35* (2021.01); *G06F 21/105* (2013.01);
(Continued)

(58) Field of Classification Search
CPC ..... H04W 12/08; H04W 12/06; H04W 88/02; H04W 88/08; H04W 12/0023;
(Continued)

(56) References Cited

U.S. PATENT DOCUMENTS 6,374,357 B1    4/2002  Mohammed et al.
6,473,800 B1 *  10/2002 Jerger ..................... G06F 21/52
                                                    709/224
(Continued)

FOREIGN PATENT DOCUMENTS

CN    102171971 A    8/2011
CN    104170425 A    11/2014
(Continued)

OTHER PUBLICATIONS

International Search Report and Written Opinion—PCT/US2016/041402—ISA/EPO—dated Oct. 14, 2016.
(Continued)

*Primary Examiner* — Jeffrey Nickerson
*Assistant Examiner* — Vadim Savenkov
(74) *Attorney, Agent, or Firm* — Loza & Loza, LLP

(57) ABSTRACT

A device obtains proof of its authority to use a first set of selectively activated features (first proof). An authorization server signs the first proof with its private key. The device sends a request to use a network service to a network node. The device sends the first proof to the network node. The network node validates the first proof using a public key of the authorization server. The network node grants the request to use the network service. The device sends a request for proof of authority for the network node to provide the network service (second proof). The device obtains the second proof, signed by another authorization server, and validates the second proof before using the network service. The first proof and the second proof each include a list of selectively activated features, where the selectively activated features are needed to use or provide the network service.

37 Claims, 21 Drawing Sheets

(51) Int. Cl.
*H04W 12/30* (2021.01)
*H04W 12/06* (2021.01)
*H04L 29/06* (2006.01)
*G06F 21/10* (2013.01)
*H04W 76/14* (2018.01)
*H04L 29/08* (2006.01)
*H04W 88/02* (2009.01)
*H04W 88/08* (2009.01)

(52) U.S. Cl.
CPC ...... *H04L 63/0823* (2013.01); *H04L 63/0869* (2013.01); *H04L 63/0892* (2013.01); *H04L 63/102* (2013.01); *H04L 63/108* (2013.01); *H04L 63/12* (2013.01); *H04L 65/1016* (2013.01); *H04L 67/303* (2013.01); *H04L 67/42* (2013.01); *H04W 76/14* (2018.02); *H04W 88/02* (2013.01); *H04W 88/08* (2013.01)

(58) Field of Classification Search
CPC .... H04W 76/14; H04L 65/1016; H04L 67/42; H04L 67/303; H04L 63/0823; H04L 63/0869; H04L 63/0892; H04L 63/102; H04L 63/108; H04L 63/12; G06F 21/105
See application file for complete search history.

(56) References Cited

U.S. PATENT DOCUMENTS

| | | |
|---|---|---|
| 7,073,055 B1 | 7/2006 | Freed et al. |
| 7,131,006 B1 | 10/2006 | Carroll |
| 7,181,620 B1* | 2/2007 | Hur .......... H04L 9/083 713/168 |
| 7,636,846 B1* | 12/2009 | Eskicioglu ........ H04N 7/163 380/228 |
| 7,698,722 B1* | 4/2010 | Chatelier ........ H04N 21/235 348/465 |
| 8,699,709 B2 | 4/2014 | Thomas et al. |
| 8,843,997 B1 | 9/2014 | Hare |
| 9,100,548 B2* | 8/2015 | Akins, III ........ H04N 21/443 |
| 9,172,544 B2 | 10/2015 | Pettigrew et al. |
| 9,178,871 B2 | 11/2015 | Feng et al. |
| 9,473,505 B1* | 10/2016 | Asano ............ H04L 63/102 |
| 10,111,025 B2* | 10/2018 | Kang ............ H04W 12/04 |
| 2003/0185368 A1* | 10/2003 | Bradfield ........ H04L 67/16 379/201.03 |
| 2004/0098609 A1* | 5/2004 | Bracewell ........ H04L 63/068 726/6 |
| 2005/0039061 A1 | 2/2005 | Schultz |
| 2005/0044367 A1* | 2/2005 | Gasparini ........ G06F 21/121 713/172 |
| 2006/0176835 A1* | 8/2006 | Jang ............ H04H 20/02 370/270 |
| 2006/0225128 A1* | 10/2006 | Aittola ........ H04L 29/12188 726/3 |
| 2008/0010669 A1* | 1/2008 | Aittola ........ H04L 29/12188 726/3 |
| 2008/0244658 A1* | 10/2008 | Chen ............ H04N 7/17318 725/50 |
| 2009/0248856 A1* | 10/2009 | Chatterjee ........ G06F 9/5055 709/224 |
| 2009/0253409 A1 | 10/2009 | Slavov et al. |
| 2010/0057925 A1 | 3/2010 | Armbruster et al. |
| 2010/0069067 A1 | 3/2010 | Vanderveen et al. |
| 2011/0113252 A1* | 5/2011 | Krischer ........ H04L 63/0823 713/175 |
| 2011/0149750 A1* | 6/2011 | Sharma ........ H04W 36/14 370/252 |
| 2012/0210136 A1* | 8/2012 | Haddad ........ H04L 63/065 713/176 |
| 2012/0210224 A1* | 8/2012 | Wong ........ H04N 21/41407 715/716 |
| 2012/0324225 A1* | 12/2012 | Chambers ........ H04L 9/0891 713/169 |
| 2013/0095812 A1* | 4/2013 | Siddam ........ H04L 41/0893 455/419 |
| 2013/0286833 A1* | 10/2013 | Torres ............ H04L 69/24 370/235 |
| 2013/0333039 A1* | 12/2013 | Kelly ............ G06F 21/51 726/24 |
| 2015/0169848 A1 | 6/2015 | Bower et al. |

FOREIGN PATENT DOCUMENTS

| | | |
|---|---|---|
| CN | 104247477 A | 12/2014 |
| WO | WO-2004019182 A2 | 3/2004 |
| WO | WO-2010030515 A2 | 3/2010 |
| WO | 2013138532 A1 | 9/2013 |

OTHER PUBLICATIONS

Cisco, "Authentication Types for Wireless Devices," Mar. 11, 2008, Retrieved from the Internet URL: http://www.cisco.com/c/en/us/td/docs/routers/access/wireless/software/guide/SecurityAuthenticationTypes.html, Retrieved dated on Nov. 5, 2015, 25 pages.

Taiwan Search Report—TW105121481—TIPO—dated Dec. 13, 2019.

* cited by examiner

| Date of Agreement — 402 | Identifier of owner of device — 404 | Identifier of manufacturer or OEM — 406 | Identifier of device (e.g., IMEI) — 408 | Authorized Feature(s) — 410 | Duration of Agreement — 412 | Limitations on Use — 414 | Fee — 416 |
|---|---|---|---|---|---|---|---|
| May 16, 2015 | Service Provider A | Corporation X | 12-123456-654321-8 | MIMO SU-MIMO MU-MIMO | Six months | 500,000 simultaneous users; not authorized for use with roaming partners L, M, N. | Y US Dollars |

| Start Date | End Date | Device Identifier (e.g., IMEI) | Authorized Feature(s) | Limitation | Public Key Identifier | Identifier of manufacturer or OEM | Fee |
|---|---|---|---|---|---|---|---|
| May 16, 2015 | November 16, 2015 | 12-123456-654321-8 | MIMO SU-MIMO MU-MIMO | 500,000 simultaneous users; not authorized for use with roaming partners L, M, N. | KeyID 1083 Certificate Holder A | Corporation X | Y US Dollars |
| June 5, 2015 | July 5, 2015, 2015 | 21-789101-111009-6 | MIMO | None | KeyID Aoe44 Certificate Holder J | Corporation X | Z US Dollars |
| May 9, 2015 | None | 16-111213-157892-0 | MIMO SU-MIMO | 250,000 simultaneous users | KeyID 092834 Certificate Holder H | Corporation X | W US Dollars |
| November 22, 2015 | November 22, 2017 | 18-843095-987123-4 | MIMO | 500,000 simultaneous users; not authorized for use with roaming partners L, M, N. | KeyID 01834jj Certificate Holder A | Corporation X | Y US Dollars |
| ... | ... | ... | ... | ... | ... | ... | ... |
| Month, day, year | Month, day, year | Identifier N | Feature(s) N | Limitation N | Identifier N | Corporation X | N US Dollars |

FIG. 5

| Start Date | End Date | Device Identifier (e.g., IMEI) | Authorized Service | Authorized Feature(s) | Identifier of manufacturer or OEM | Fee |
|---|---|---|---|---|---|---|
| 602 | 604 | 606 | 608 | 610 | 612 | 614 |
| May 16, 2015 | November 16, 2015 | 12-123456-654321-8 | IP Multimedia Subsystem (IMS) | MIMO SU-MIMO MU-MIMO | Corporate Entity X | A US Dollars |
| June 5, 2015 | July 5, 2015 | 21-789101-111009-6 | Push-To-Talk | MIMO | Corporate Entity X | B US Dollars |
| May 9, 2015 | None | 16-111213-157892-0 | Multimedia Messaging Service (MMS) | MIMO SU-MIMO | Corporate Entity X | C US Dollars |
| November 22, 2015 | November 22, 2017 | 18-843095-987123-4 | IMS | MIMO | Corporate Entity X | D US Dollars |
| January 8, 2015 | January 8, 2016 | 21-481384-781543-1 | MMS IMS | MIMO SU-MIMO MU-MIMO | Corporate Entity Z | E US Dollars |
| March 25, 2015 | June 25, 2015 | 54-846291-264815-3 | Push-To-Talk | MIMO | Corporate Entity Z | F US Dollars |
| October 1, 2015 | April 1, 2015 | 11-864215-894572-0 | Caller ID | MIMO SU-MIMO | Corporate Entity R | G US Dollars |
| June 1, 2015 | None | 83-249593-827351-4 | Three-way Conference Calling | MIMO | Corporate Entity L | H US Dollars |
| ... | ... | ... | ... | ... | ... | ... |
| Start Date | End Date | Identifier N | Authorized Service N | Authorized Feature N | Corporate Entity X | I US Dollars |

FIG. 6

VALIDATING AUTHORIZATION FOR USE OF A SET OF FEATURES OF A DEVICE

This application claims priority to U.S. Provisional Application No. 62/202,664 filed Aug. 7, 2015, titled Validating The Authorization For Use Of A Set Of One Or More Features Of A Device, the contents of which are incorporated by reference herein.

FIELD

The present application relates to validation of an authorization, received by a device, to activate a set of features that may be selectively activated and thereby initiate or maintain a service between the device and an entity validating the authorization.

BACKGROUND

Most communication devices (e.g., chip components, client devices, network nodes) offer multiple features. The features may be implemented in hardware and/or software.

Some features of a communication device may be activated, when an entity obtains the communication device. Other features may not be activated. For example it may be possible for a manufacturer, subcomponent manufacturer, or original equipment manufacturer (OEM) to produce different models (e.g., versions) of a communication device that has one or more features included in the communication device, where the one or more features are activated or deactivated based on the device model. Consequently, a subset (e.g., less than an entire set) of the features of the communication device may be operative in a final product. For example, a manufacturer may activate a feature a first model but not activate the feature in a second model, even though both models include all hardware and software used to implement the feature. Additionally or alternatively, portions of processing circuit readable instructions stored on the communication device may not be executed to preclude a feature from activation. Enabling and/or disabling hardware and/or software increases and/or decreases a number of features that are activated in a final product and may, for example, affect the price of the final product.

Accordingly, when a communication device is deployed, the communication device may be capable (e.g., in terms of hardware and/or software or firmware) of performing certain features as a part of its operation but may not be authorized to use the certain features. Limits on authority to use the features may be based, for example, on a purchase agreement that limits uses of features and/or services available to the communication device.

SUMMARY

The aspects disclosed herein provide methods and apparatus for dynamically validating the authorization for use of a set of one or more features of an electronic device.

In some aspects, a method may include obtaining a proof of authority for a device to use a first set of selectively activated features at the device. The proof of authority for the device can be signed by a first authorization server. The method can include sending a request to use a network service to a network node, wherein the first set of selectively activated features includes first selectively activated features needed by the device to use the network service. The device may obtain, from the network node, in response to sending the request to use the network service, a request for the proof of authority for the device. The device may send to the network node, the proof of authority for the device and a request for proof of authority for the network node to provide the network service. The device may obtain, from the network node, the proof of authority for the network node to use a second set of selectively activated features at the network node, signed by a second authorization server, wherein the second set of selectively activated features includes second selectively activated features needed by the network node to provide the network service. The method may also include validating the proof of authority for the network node before using the network service.

In some examples, the device can be a chip component, a client device, a network access node, a mobility management entity, or a gateway device. In one example, the device can be a client device or a chip component, and the network node can be a network access node.

In an aspect, the proof of authority for the device can originate at the first authorization server, can be signed with a private key of the first authorization server, and can include a listing of the first selectively activated features. The method may further include validating the proof of authority for the device by validating the listing of the first selectively activated features using a public key of the first authorization server. The method may still further include obtaining feature activation keys associated with the first selectively activated features, encrypted with a public key of the device, decrypting the feature activation keys, using a private key of the device, known only to the device, and activating and/or maintaining activation of the first selectively activated features with the feature activation keys.

In an example where the proof of authority for the network node originates at the second authorization server, is signed with a private key of the second authorization server, and includes a listing of the second selectively activated features, the method may further include validating the proof of authority for the network node by validating the listing of the second selectively activated features using a public key of the second authorization server.

In an aspect, the first authorization server can be a local authorization server.

In another aspect, the method may further include identifying a third set of selectively activated features needed by the network node to use the network service, and using the network service based on determining whether the third set of selectively activated features is included in the second set of selectively activated features.

In an implementation, the proof of authority for the device originates at the first authorization server and is obtained, at the device, from the first authorization server, and the proof of authority for the network node originates at the second authorization server and is obtained, at the device, from the network node. In an aspect, the first authorization server and the second authorization server can be one authorization server.

In some aspects, the proof of authority for the device is obtained from the first authorization server during a feature activation process, during which the device obtains authorization to activate the first selectively activated features. In some aspects, the proof of authority for the device can be data representative of an authorization certificate. In other aspects, the proof of authority for the device can be data representative of an authorization agreement indicating that the device is authorized to activate the first selectively activated features.

In one example, a device includes a network communication circuit and a processing circuit coupled to the network communication circuit. The processing circuit may be configured to perform the above-described method(s).

In another aspect, a method, operational at a network node, may include obtaining a request, from a device, to use a network service. The method may include obtaining proof of authority for the device to use a first set of selectively activated features at the device. The proof of authority for the device can be signed by an authorization server. The method may also include validating the proof of authority for the device. The method may further include identifying a second set of selectively activated features needed by the device to use the network service, and sending a response to the request based on results of validating the proof of authority for the device and determining whether the second set of selectively activated features is included in the first set of selectively activated features. In some aspects, the network node can be a network access node, a mobility management entity, or a gateway device.

In an example, the first set of selectively activated features includes first selectively activated features, and the proof of authority for the device originates at the authorization server. The proof of authority for the device can include a listing of the first selectively activated features, signed with a private key of the authorization server. The method can further include validating the proof of authority for the device by validating the listing of the first selectively activated features using a public key of the authorization server.

In an aspect, the proof of authority for the device can originate at the authorization server and can be obtained, at the network node, from the device. In another aspect, the proof of authority for the device can originate at the authorization server and can be obtained, at the network node, in a form of a capability profile of the device, from a home subscriber server (HSS).

In an implementation, the proof of authority for the device can data representative of an authorization certificate. In another implementation, the proof of authority for the device can be data representative of an authorization agreement indicating that the device is authorized to activate the first set of selectively activated features.

In an aspect, identifying the second set of selectively activated features can include deriving selectively activated features needed by the device to use the network service from a model-specific and/or a device-specific list of authorized selectively activated features maintained by the authorization server. In another aspect, identifying the second set of selectively activated features can include deriving selectively activated features needed by the device to use the network service from a model-specific and/or a device-specific list of licensable selectively activated features maintained by the authorization server.

In an implementation, the method may include verifying that the device holds a private key that corresponds to a public key of the device included with the proof of authority for the device, wherein sending the response to the request is further based on a result of the verifying.

In an aspect, a network node can include a network communication circuit and a processing circuit coupled to the network communication circuit. The processing circuit may be configured to perform the above-described method(s).

In an aspect, a method operational at a server, may include obtaining a first list of selectively activated features of a device, and updating a second list of selectively activated features of the device, stored at the server, based on the first list, wherein the second list is associated with a subscription profile of the device, to reflect a change to an authorization status of at least one selectively activated feature in the second list.

In an example, the server can be a home subscriber server (HSS).

In an implementation, the method can further include sending, responsive to a query concerning capability of the device, a capability profile including the second list of selectively activated features of the device.

In an aspect, when the first list of selectively activated features originates at an authorization server and is signed with a private key of the authorization server, the method may further include validating the first list of selectively activated features using a public key of the authorization server.

In an aspect, the authorization server can be a local authorization server.

In an aspect, the first list of selectively activated features can be data representative of an authorization certificate signed by an authorization server. In another aspect, the first list of selectively activated features can be data representative of an authorization agreement indicating that the device is authorized to activate the selectively activated features.

In an aspect, a server (e.g., an HSS) can include a network communication circuit for communicating over a network and a processing circuit coupled to the network communication circuit. The processing circuit may be configured to perform the above-described method(s).

DRAWINGS

FIG. 4 illustrates an exemplary list of parameters and data that may be included in an exemplary authorization agreement between a first entity and a manufacturer or OEM of one or more devices in accordance with aspects described herein.

FIG. 5 illustrates an exemplary list of parameters and data that may be included in an exemplary authorization agreement between a manufacturer or OEM and another entity in accordance with aspects described herein.

FIG. 6 illustrates an exemplary list of parameters and data that may be included in an exemplary authorization agreement between a network operator and another e in accordance with aspects described herein.

Figure 15:
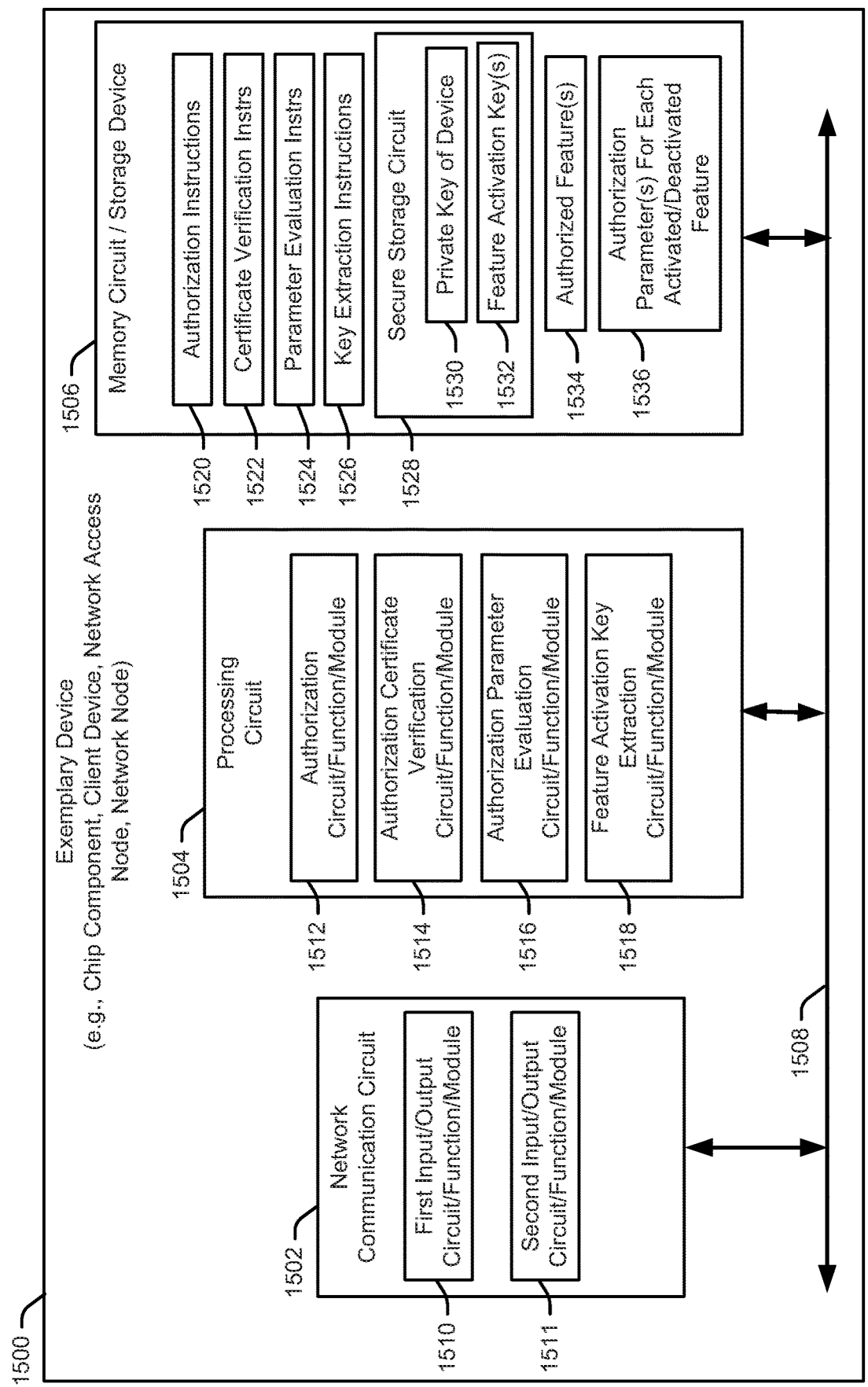

FIG. 15 is a block diagram illustrating an exemplary device configured to support dynamic verification and enforcement of authorization agreements, where enforcement includes dynamic validation of proof of authority for a device to use a set of selectively activated features and activation/deactivation of selectively activated features in accordance with the terms of the authorization agreements, in accordance with aspects described herein.

Figure 16:
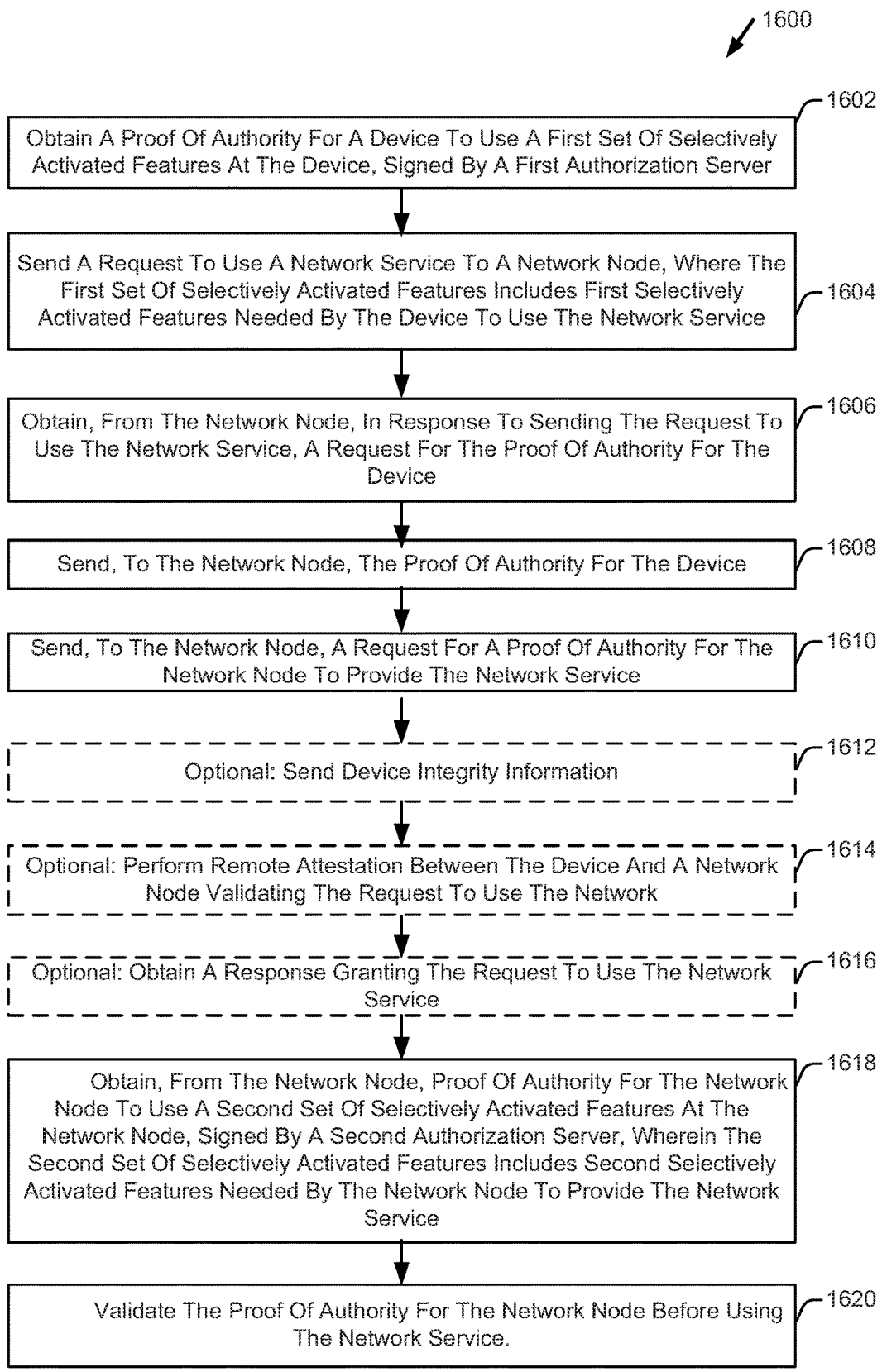

FIG. 16 is a flowchart of an exemplary method operational at a device in accordance with aspects described herein.

Figure 17:
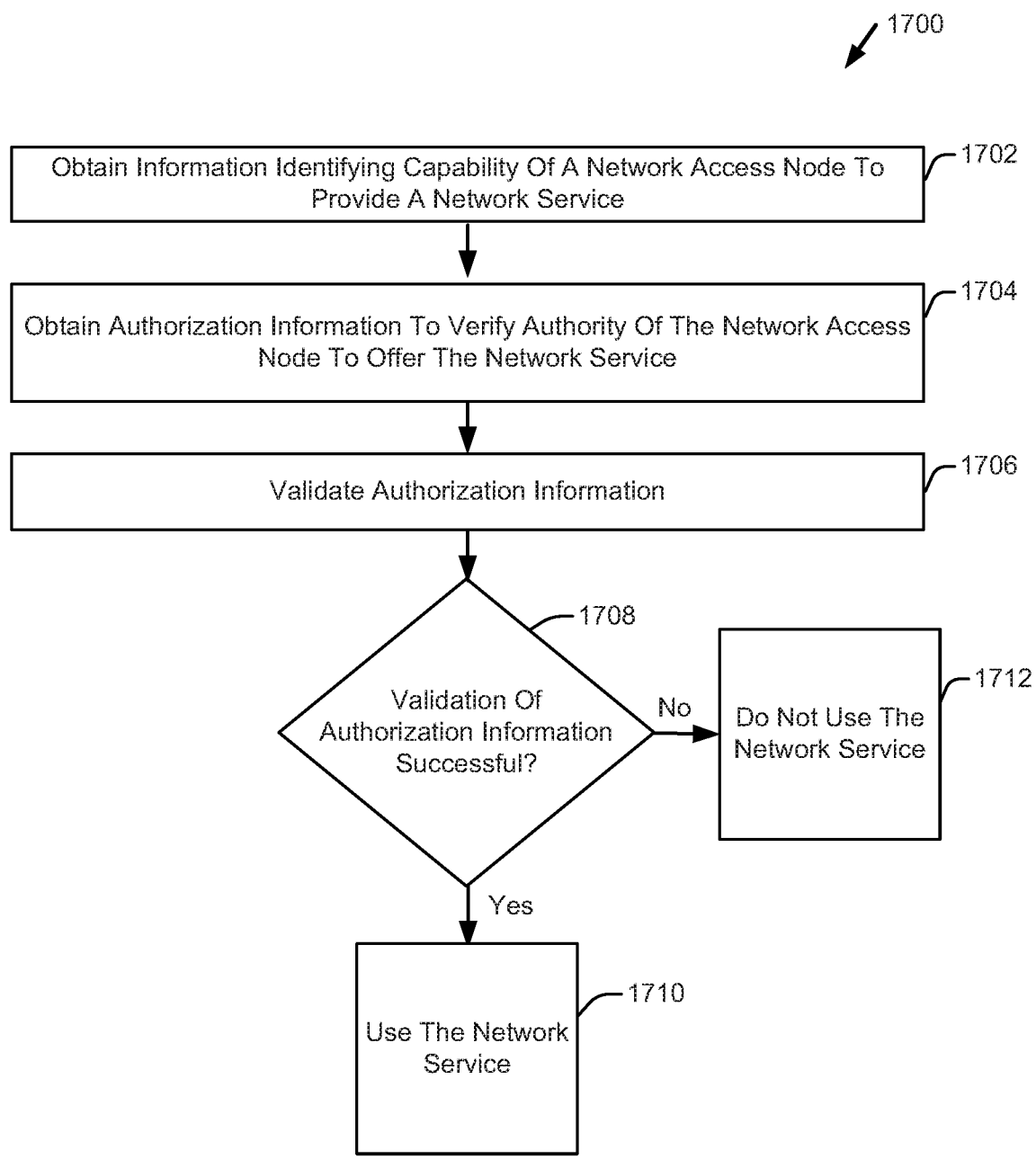

FIG. 17 is a flowchart of an exemplary method operational at a device in accordance with aspects described herein.

Figure 18:
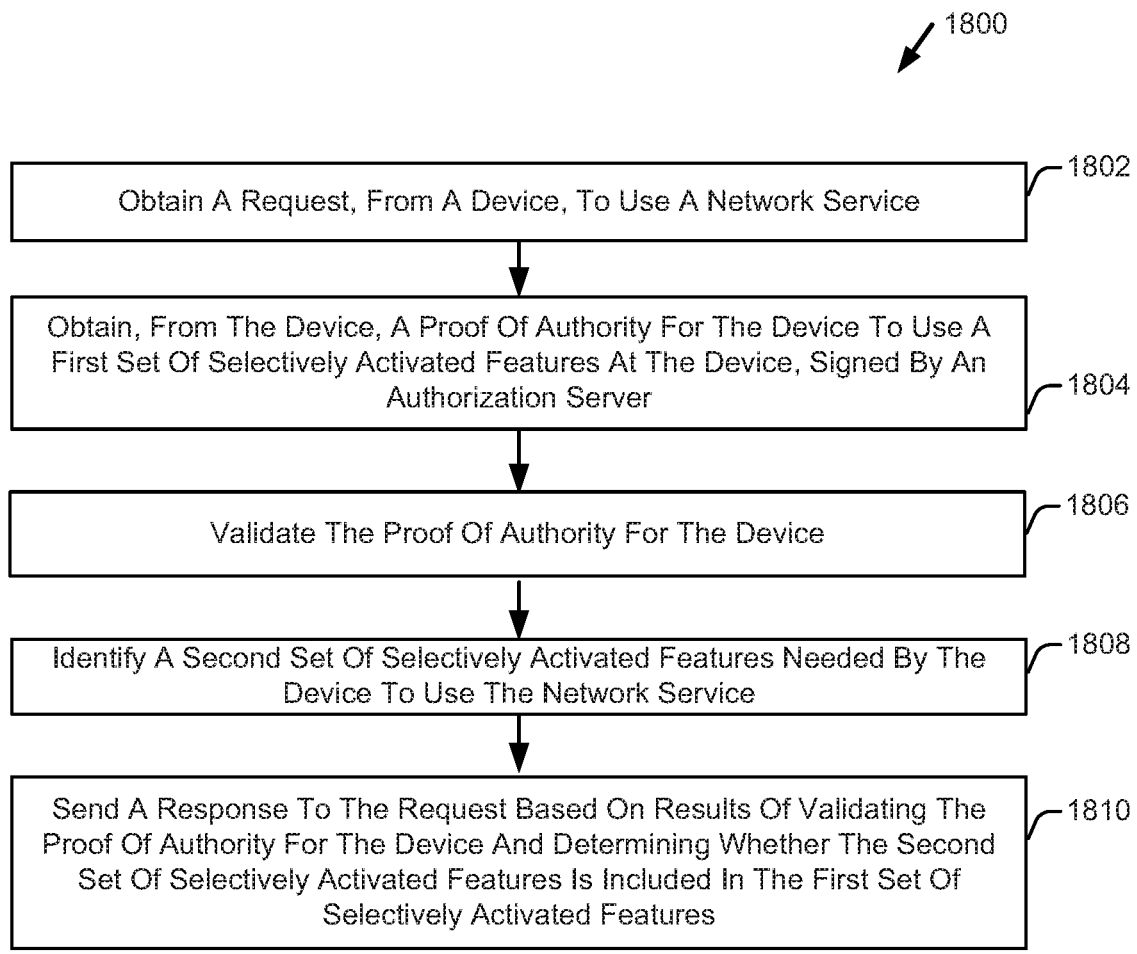

FIG. 18 is a flowchart of an exemplary method operational at a network node in accordance with aspects described herein.

Figure 19:
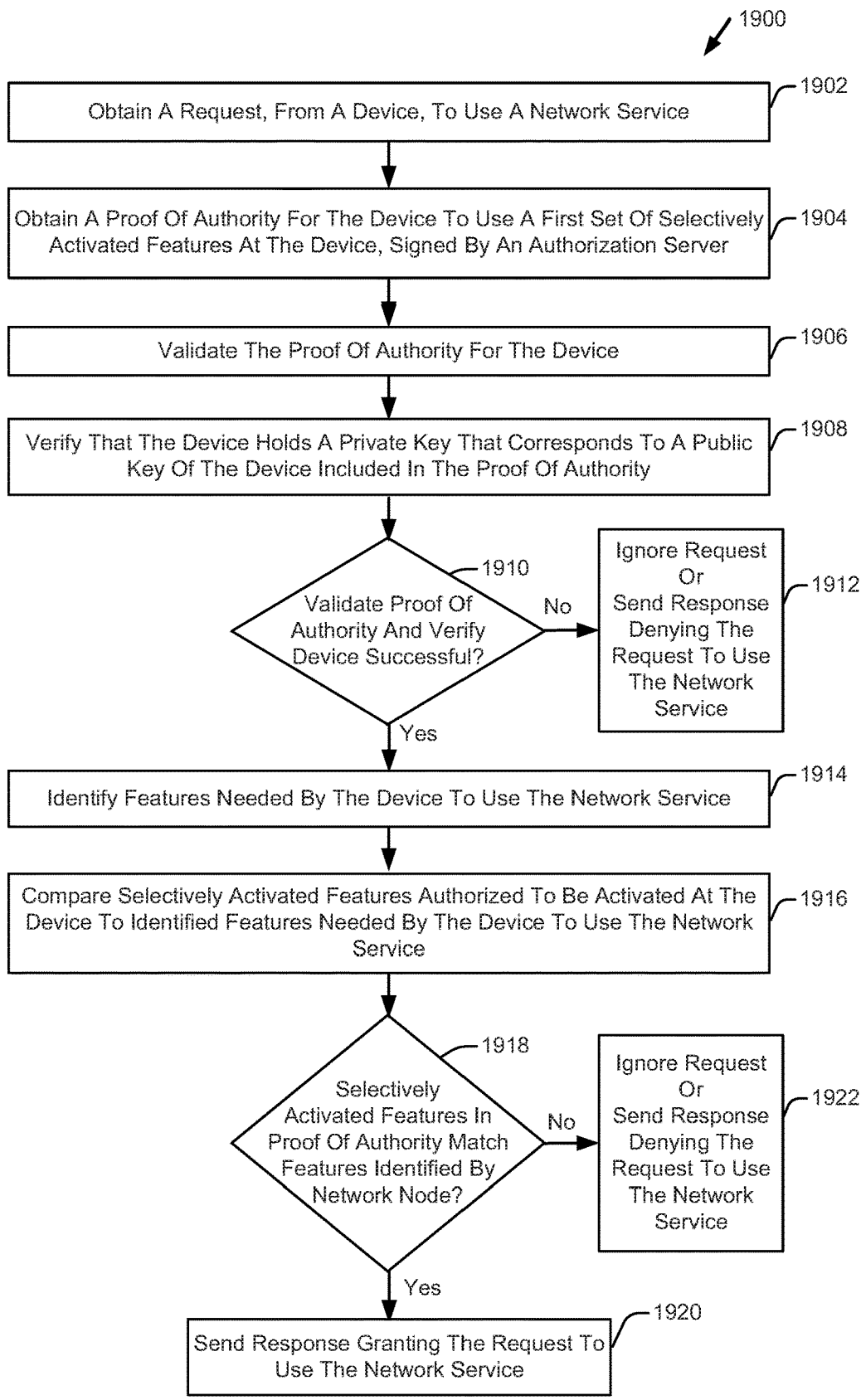

FIG. 19 is a flowchart of another exemplary method operational at a network node in accordance with aspects described herein.

Figure 20:
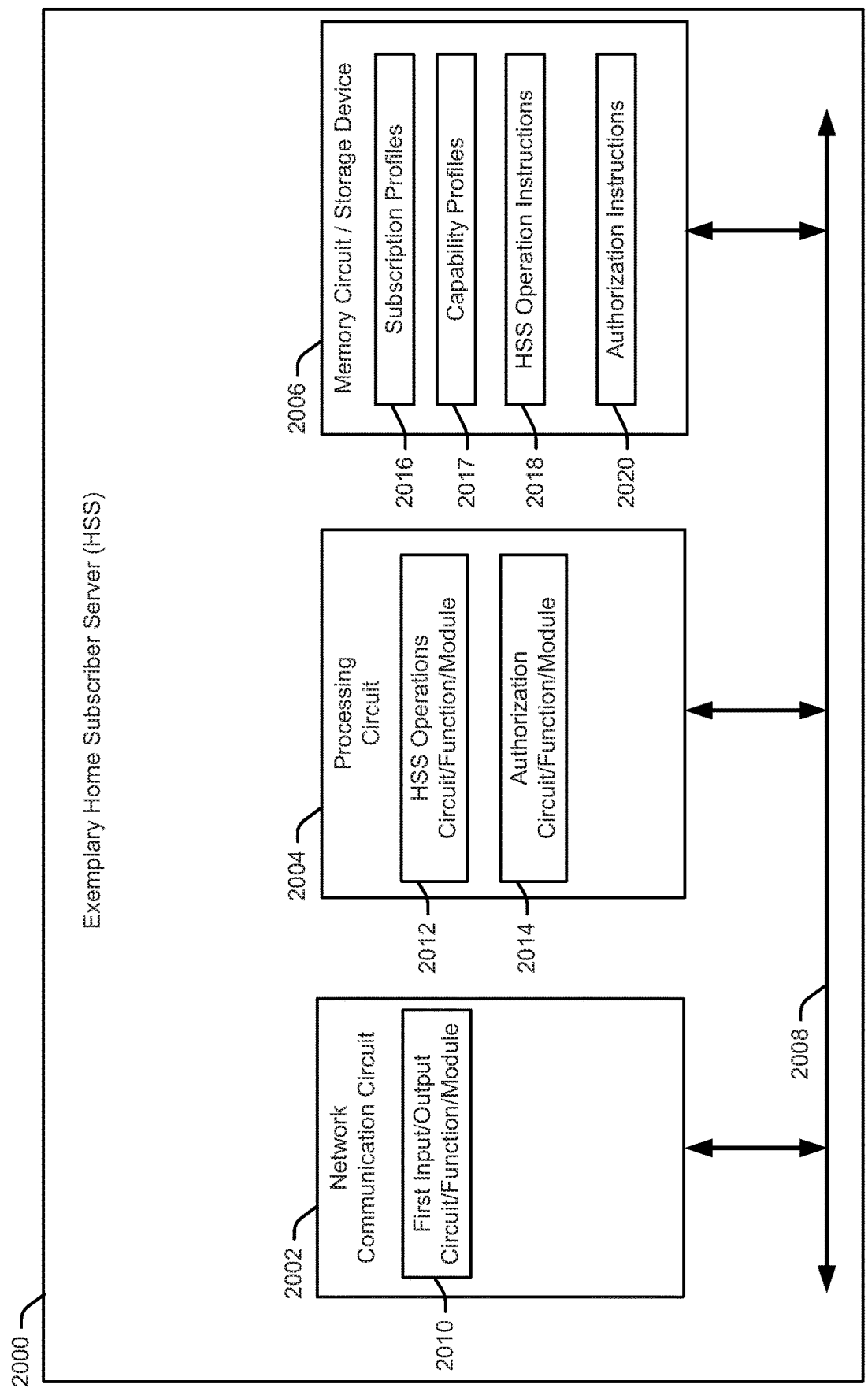

FIG. 20 is a block diagram illustrating an exemplary home subscriber server (HSS) configured to support verification and enforcement of authorization agreements in accordance with aspects described herein.

Figure 21:
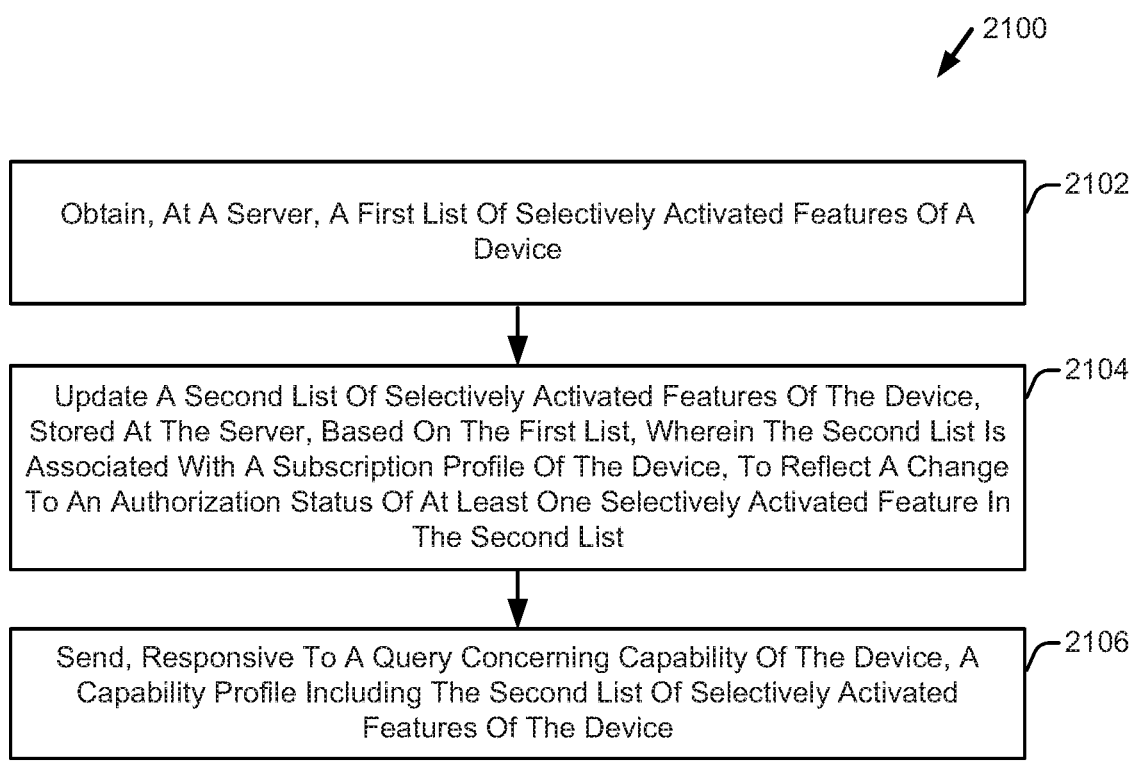

FIG. 21 illustrates an exemplary method operational at an HSS, which is related to validating the authorization for use of a set of one or more features of a device according to aspects described herein.

DETAILED DESCRIPTION

In the following description, reference is made to the accompanying drawings in which is shown, by way of illustration, specific aspects and features described in the disclosure. The aspects and features described in the disclosure are intended to be provided in sufficient detail to enable those skilled in the art to practice aspects of the disclosure. Other aspects and features may be utilized and changes may be made to that which is disclosed without departing from the scope of the disclosure. The following detailed description is not to be taken in a limiting sense and the scope of the aspects and features described and illustrated herein are defined only by the appended claims.

The term "exemplary" is used herein to mean "serving as an example, instance, or illustration." Any aspect or implementation described herein as "exemplary" is not necessarily to be construed as preferred or advantageous over other aspects or implementations.

The term "aspect" as used herein does not require that all aspects include the discussed aspect, or any discussed aspect, advantage, and/or mode of operation.

The term "obtain" is used herein to mean derive, generate, compute, request, receive, acquire, accept, procure, take, collect, get, take delivery or receipt of, be given, gain access to, come into possession of, etc. The term "obtain" as used herein encompasses obtaining locally, and/or obtaining from a non-local or remote entity.

The term "provision" is used herein to mean send, forward, provide, supply, to cause to be conveyed to a destination. The term "send" is used herein to mean provision, forward, provide, supply, to cause to be conveyed to a destination.

As used herein, the term "manufacturer" may refer to an entity that builds a product, and sells the product under the entity's own name to consumers or OEMs. An OEM may be an entity that purchases products from another entity and rebrands the products for sale under the OEM's name. An OEM may additionally or alternatively be an entity that purchases different types of products (e.g., servers and data storage products), from the same or different manufacturers, bundles the products together and sells the resulting bundled product under the OEM's name.

The term "device" may be used herein to refer to any communication device such as a chip component, a client device, and/or a network node. A "chip component" may include, for example, a processing circuit, a modem, a chip set. A "client device" may include, for example, a wireless device, mobile device, subscriber device, mobile phone, mobile communication device, mobile computing device, digital tablet, smart phone, user equipment (UE), user device, user terminal, terminal, station (STA). A "network node" may include any device or machine that is a functional node of a serving network or a home network. Examples of a network node include, but are not limited to, a base station, a network access node (e.g., an evolved node B (eNodeB, eNB)), a mobility management entity (MME), a gateway device (e.g., a serving gateway (S-GW), a packet data network gateway (P-GW)), a home subscriber server (HSS), an authorization, authentication, and accounting (AAA) server (collectively referred to as an HSS/AAA server), a wireless router, an access point (AP), and/or any node performing a network function. A client device and/or a network node may include a chip component.

The term "network access node" may be used herein to refer to any device that includes wireless device connectivity between a device (e.g., chip component, a client device) and a core network. Examples of a network access node may include an eNB, a base station, an AP. A network access node may be understood to be one example of a network node.

Networks external to a core network of a cellular communication system, such as a packet data network (PDN) (e.g., the Internet) and an IP Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in a cellular communication system.

As used herein, a reference to a "feature", including a reference to a "selectively activated feature", may be a reference to an aspect, circuit, service, or function of a device (e.g., chip component, client device, network node) that may be implemented in hardware, software, firmware, or any combination of two or more of hardware, software, and firmware.

The term "selectively activated" may describe a characteristic, or ability, of being changed in its state of activation (e.g., it may be activated and de-activated). In some aspects, the term "selectively activated" may describe a characteristic, or ability, to be specifically enabled/disabled, turned-on/turned-off, and/or started/stopped (e.g., on command/demand). Accordingly, selectively activated features are, for example, features that are able to be specifically activated and/or de-activated (e.g., on command/demand).

As used herein, reference to a "network service" may be a reference to a function, capability, application, or portion thereof that is offered by or available through a network. A device (e.g., client device, chip component, network node) may include a set of selectively activated features to implement a network service.

As used herein, the term "authorization information" is understood to mean "proof of authority for a device to use a set of selectively activated features at the device" or "proof of authority for a network node to use a set of selectively activated features at the network node." Authorization information may be represented by, may include, or may identify an authorization agreement, an authorization certificate, or an authorization agreement and an authorization certificate. Alternatively or additionally, authorization information may include or identify a list of the set of selectively activated features derived by an authorization server (or local authorization server), from an authorization agreement stored at the authorization server (or local authorization server).

As used herein, reference to a "feature activation key", "feature activation keys", or "feature activation key(s)" may be a reference to data (e.g., a sequence or string of bits) used to enable a given feature. The feature activation key may be related to and/or derived with a cryptographic function.

The term "up-to-date" may be used to denote or describe a thing (e.g., a license) that validly extends up to the present time. Thus, for example, an up-to-date license may be a license that is valid up to the present time.

As used herein, the term "match" may mean "equal to" or may mean "to correspond to" in some fundamental or basic respect.

When a device (e.g., chip component, client device, network node) seeks to use a network service, the device, in addition to authenticating itself to a network node providing the network service, may also need to send proof, to the network node, that the device is authorized to activate a set of selectively activated features. The set of selectively activated features, or a subset thereof, may be needed by the device to use the network service. Consequently, to prove the authority of the device to activate a set of selectively activated features, the device may send a proof of authority for the device to use the set of selectively activated features at the device. This proof of authority may be obtained by the device from the authorization server. The device may send the proof of authority for the device to use the set of selectively activated features at the device to the network node that provides the network service. In one aspect, the proof of authority for the device to use the set of selectively activated features at the device may include a list that identifies the features in the set of selectively activated features that are authorized to be activated at the device. In one aspect, the set of selectively activated features may be derived from an authorization agreement. The authorization agreement may be stored at the authorization server. The proof of authority for the device to use the set of selectively activated features at the device may be validated by the network node. In one aspect, validating the proof of authority for the device to use the set of selectively activated features at the device permits the network node to ensure that the selectively activated features needed by the device to use the network service are, for example, authorized for use on the device before the device uses the network service. For example, validating the proof of authority for the device to use the set of selectively activated features at the device permits the network node to ensure that the selectively activated features listed in the set of selectively activated features are paid for under the terms of a license, which may be reflected in an authorization agreement, before the device uses the network service.

When, for example, a network access node (e.g., eNB) is authorized to provide a service, a message announcing capabilities (e.g., guaranteed delivery, guaranteed bandwidth, and/or other aspects related to quality of service) of the network access node may be broadcast over-the-air so that a device (e.g., chip component, client device) receiving the message can determine if the device wants to use the service. A device receiving the message may already be authorized to activate, and may already have activated, a set of selectively activated features needed to use the service. Nevertheless, the device may want to validate the authorization of the network access node to provide the service. A device should have the opportunity to validate that the network access node is authorized to provide the network service to avoid, for example, an additional charge for an unavailable network service. In one aspect, validating the authorization of the network access node to provide the service permits the device to ensure that the network access node is authorized to provide the service before the device uses the service.

By way of example, a System Information Broadcast (SIB) and a System Information (SI) message (used to convey one or more SIBs), do not carry any message authentication code or signature signed by a network node. If a device is camped on a cell and obtains an SIB from a network access node, the device cannot verify whether the features advertised in the SIB are validly offered by the network node. To gain access to the network, the device basically trusts, without any ability to verify, that the network is authorized to offer the features that are advertised in the SIB.

Aspects disclosed herein can provide methods and apparatus for validating authorization information dynamically to permit a first device or node to send first authorization information to a second device or node and obtain second authorization information from the second device or node before beginning to use a service offered by the second device or node. Aspects disclosed herein can permit a device to verify whether a network node is a valid network node and whether the network node is authorized to activate certain features. In an aspect, validation, verification, or validation and verification, may include a cryptographic operation.

Overview

A device chip component, client device, network node) may include an authorization circuit/function/module that activates, deactivates, and/or reports-on one or more selectively activated features of the device. The authorization circuit/function/module may additionally verify that the device has authority to activate and/or use/provide a given feature. In some aspects, verification may be by validation of proof of authority for the device to use a set of selectively activated features at the device (e.g., authorization information of the device).

In one aspect, using a client device as an example, the client device may determine that a network service is available from a network node (e.g., a network access node, an eNB, MME). The client device may determine which feature(s) (from among a plurality of features available to the client device) the client device needs to use the service. The client device may engage in a feature activation process with an authorization server to obtain proof of authority for the client device to use a set of selectively activated features at the client device (e.g., authorization information in the form of an authorization certificate) and feature activation key(s) needed to activate the features needed to use the network service. The client device may send a request to the network node to request to use the network service. The client device may send the proof of authority for the client device to use the set of selectively activated features at the client device (e.g., the authorization information of the device) to the network node. In response, the client device may obtain a response from the network node granting the request to use the network service. The response may have been predicated on the network node validating the authorization information sent to the network node by the client device. Furthermore, in a case where the network node is an MME, the network node may use the list of features authorized to be activated at the client device, which can be included in the authorization information, to configure a client device context (e.g., a UE context) for the client device.

The client device, before using the network service, may want to validate the authority of the network node to offer the service. The client device may therefore obtain, from the network node, a proof of authority for the network node to use a set of selectively activated features at the network node (e.g., authorization information in the form of an authorization certificate). The client device may verify the proof of authority for the network node to use the set of selectively activated features at the network node before using the network service.

Exemplary System and System Description

Figure 1:
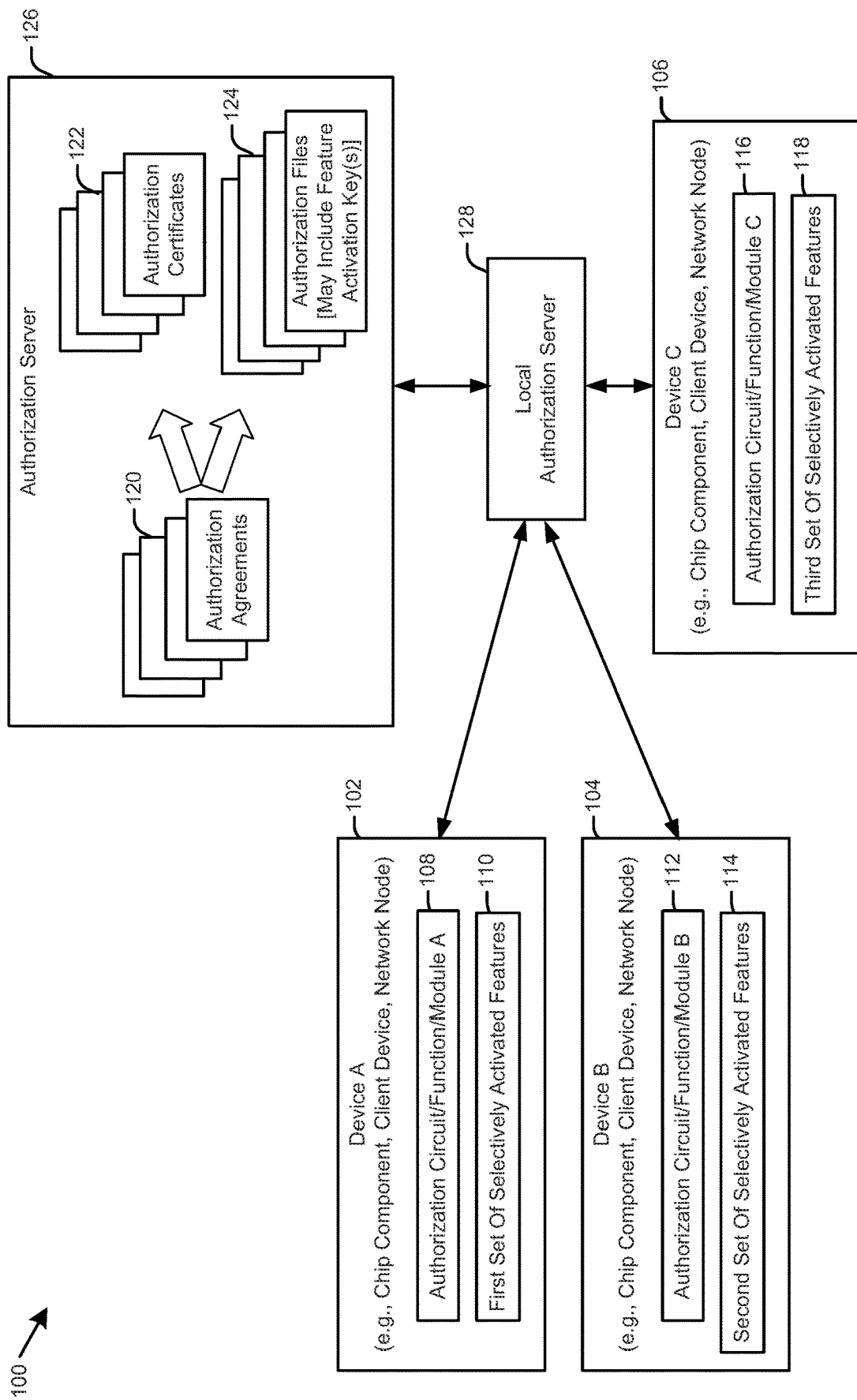
FIG. 1 is a block diagram of an exemplary system that may dynamically authorize and activate one or more selectively activated features on a set of one or more devices according to aspects described herein.

FIG. 1 is a block diagram of an exemplary system 100 that may dynamically authorize and activate one or more selectively activated features on a set of one or more devices (e.g., chip components, client devices, network nodes) according to aspects described herein. The set of one or more devices is exemplified in FIG. 1 with Device A 102, Device B 104, and Device C 106. Device A 102, Device B 104, and Device C 106 may each include an authorization circuit/function/module 108, 112, 116. The authorization circuit/function/module 108, 112, 116 may be useful in a system where, for example, services (e.g., network services) can be implemented in whole or in part using device features (e.g., selectively activated features) that can be individually activated/deactivated (e.g., enabled/disabled) according to, for example, terms of licenses, in real time. An authorization circuit/function/module 108, 112, 116 may be included with any device such as Device A 102, Device B 104, or Device C 106 that includes a selectively activated feature, where authorization to activate the selectively activated feature can be based, for example, on an authorization agreement 120. The authorization agreement 120 may therefore be a source for proof of a right to activate the selectively activated feature.

Device A 102 includes authorization circuit/function/module A 108 and a first set of selectively activated features 110. Device B 104 includes authorization circuit/function/module B 112 and a second set of selectively activated features 114. Device C 106 includes authorization circuit/function/module C 116 and a third set of selectively activated features 118. For ease of reference, and without any limiting intent, authorization circuit/function/module A 108, authorization circuit/function/module B 112, and authorization circuit/function/module C 116 may be referred to, individually and/or collectively, as "authorization function 108, 112, 116" herein. Additionally, for ease of reference, and without any limiting intent, Device A 102, Device B 104, and Device C 106 may be referred to, individually and/or collectively, as "device 102, 104, 106" herein.

Authorization to activate one or more selectively activated features in a set of selectively activated features (such as the first set of selectively activated features 110, the second set of selectively activated features 114, and/or the third set of selectively activated features 118) at a given device (such as Device A 102, Device B 104, and/or Device C 106) may be a prerequisite to activation of the one or more features at the given device.

In some aspects described herein, an authorization function 108, 112, 116 of a device 102, 104, 106 may obtain and verify proof that the device 102, 104, 106 was authorized to activate a selectively activated feature by an authorization server 126 and to obtain and verify the proof (e.g., authorization information) before the device 102, 104, 106 activates the selectively activated feature. In some implementations, the authorization function 108, 112, 116 at a first device may also send the proof to a second device, where the second device may provide a service (e.g., a network service) to the first device.

Examples of network services may include, for example, dual connectivity service, multiple subscription service, device-to-device (D2D) mode service, multimedia broadcast/multicast service (MBMS), and/or an unlicensed operation service. A dual connectivity service may, for example, provide connectivity both within a radio access technology (RAT) (e.g., 4G) and across RATs (e.g., across 4G and 5G and/or wireless local area network (WLAN)).

A multiple subscription service may provide, for example, services to a device using a single radio link to serve multiple subscriptions simultaneously (e.g., an operator service subscription and a streaming video subscription and/or an online retail sales provider subscription simultaneously).

A D2D mode service may offer, for example, a service providing proximal discovery of services, friends, and offers. A D2D service maybe offered, for example, in addition to a traditional access service.

An MBMS service may be a service that facilitates a device to receive multicast services in addition to access to unicast services.

An unlicensed operation service may be, for example, a service that allows a device to use licensed assisted access or operate in an unlicensed band using LTE or 5G or one or more other RATs. A complete list of features (e.g., selectively activated features) that may need to be activated to use the above-listed exemplary services, as well as other services, is beyond the scope of this application. Nevertheless, some examples of features that may be selectively activated may include: carrier aggregation; certain physical channels (e.g., in the case of dual connectivity, D2D, and/or unlicensed operation services); selectively activated hardware; and/or selectively executed portions of processing circuit readable instructions stored on the device that were otherwise left unexecuted to preclude a given selectively activated feature from activation.

Providing the proof (e.g., authorization information) to the second device may be a prerequisite before the second device provides the service. Therefore, for example, even after the first set of selectively activated features 110 is authorized and activated at Device A 102, another device (e.g., Device C 106) (e.g., a network access node) may request Device A 102 to send proof of authority of Device A 102 to use the first set of selectively activated features 110 at Device A 102, where the proof of authority can be signed by the authorization server 126. Still further, in some implementations, before Device A 102 uses (e.g., activates, employs) a service (e.g., a network service) offered by Device C 106 (where a third set of selectively activated features includes third selectively activated features needed by Device C 106 to provide the service to Device A 102), and even after the third set of selectively activated features 118 are authorized and activated at Device C 106 (e.g., a network access node), Device A 102 (e.g., a client device) may request Device C 106 to send proof of authority of Device C 106 to use the third set of selectively activated features 118 at Device C 106, where the proof of authority can be signed by the authorization server 126 (or another authorization server).

Device A 102 may send the request for proof to Device C 106 before using the service offered at Device C 106. Device A 102 may obtain and verify the proof obtained from Device C 106 before using the service offered at Device C 106.

Authorization information (e.g., proof if authority for the device to use a set of selectively activated features at the device) may be based on an authorization agreement 120. Authorization information may be provided, for example, in the form of the authorization agreement 120 and/or an authorization certificate 122. The authorization agreement 120 may be stored at an authorization server 126. The authorization server 126 may derive an authorization certificate 122 and an authorization file 124 (which may including feature activation keys) based on the authorization agreement 120. The authorization certificate 122 may include, for example, the device 102, 104, 106 public key, the selectively activated features authorized to the device 102, 104, 106 (e.g., a set of selectively activated features), and an identifier (e.g., a hash of the device public key or some other device unique identifier) of the device 102, 104, 106 to which the selectively activated features are authorized. The authorization certificate 122 may also include, for example, the expiration time of the authorization certificate 122 and may additionally or alternatively include parameters related to the selectively activated features authorized to the device 102, 104, 106. The authorization certificate may be signed by the authorization server 126 using a private key of the authorization server 126.

Accordingly, the authorization certificate 122 carries the signature of the authorization server 126; the signature can be verified using the public key of the authorization server 126. To derive the signature, for example, the authorization server 126 may apply the device 102, 104, 106 public key, the selectively activated features authorized to the device 102, 104, 106, and the identifier of the device 102, 104, 106 to a hash function; the authorization server 126 may then input the derived hash value and the private key of the authorization server 126 to a signature function. A verification function may be an inverse of the signature function; an entity (e.g., network node) may verify the signature by inputting the signature and the public key of the authorization server 126 to the verification function. In this way, the authorization certificate 122 may be verified and may be used as proof of authority for the device 102, 104, 106 to use a set of selectively activated features at the device 102, 104, 106, when the authorization certificate 122 is signed by the authorization server 126. Accordingly, the authorization certificate 122 may be used as authorization information.

In essence, devices 102, 104, 106 are provisioned with the authorization server's certificate during the feature activation. The authorization certificate 122 may also serve to prove that the authorization server 126 issued an authorization file 124 to the device 102, 104, 106 identified in the authorization file 124.

It is noted that when the device 102, 104, 106 sends the authorization certificate 122 to an entity (e.g., a network node), the device 102, 104, 106 may sign the authorization certificate 122 with a private key of the device 102, 104, 106. This facilitates an ability of the device 102, 104, 106 to prove that the device 102, 104, 106 is the owner of the public key that is included in the authorization certificate 122. Using the public key included in the authorization certificate 122, the entity (e.g., the network node) can verify that the device that sent the authorization certificate 122 is the same device identified by the authorization server 126 in the authorization certificate 122.

The authorization information may be requested by a device 102, 104, 106 at any time (e.g., during initial attach, service request, handover, on demand).

An authorization function 108, 112, 116 may activate a given selectively activated feature (or may authorize/command/instruct the device 102, 104, 106 hosting the authorization function 108, 112, 116 to activate the given selectively activated feature) if the authorization function 108, 112, 116 obtains and verifies an authorization agreement 120, or an authorization certificate 122 derived from the authorization agreement 120. The authorization agreement 120, as well as the authorization certificate 122, can record a right of the device 102, 104, 106 to activate the given selectively activated feature.

An authorization function 108, 112, 116 may send a feature activation request (e.g., a request to activate one or more selectively activated features, a request for authorization to activate one or more selectively activated features) to a local authorization server 128. The response to the feature activation request may include authorization information (e.g., proof of authority for the device 102, 104, 106 to use a set of selectively activated features, including the one or more selectively activated features identified in the feature activation request, at the device). The response may also include an authorization file 124. The authorization file 124 may include one or more feature activation key(s). The authorization server 126 may encrypt the authorization information, authorization file, and/or the one or more feature activation keys.

The authorization server 126 may sign the authorization information with a private key of a public/private key pair belonging to the authorization server 126. In a case where the authorization information comprises an authorization certificate, the authorization server 126, for example, may sign the authorization certificate with the private key of the public/private key pair belonging to the authorization server 126. The device 102, 104, 106 may use a public key of the authorization server 126 to verify that the authorization certificate 122 is authentic. Persons skilled in the art will appreciate that alternative ways to sign items such as an authorization certificate 122 are within the scope of the aspects presented herein.

The authorization server 126 may encrypt the authorization file 124 that may include one or more feature activation keys using the public key of a public/private key pair belonging to the device 102, 104, 106. In some aspects, only the authorization function 108, 112, 116 has access to the private key of the public/private key pair belonging to the device 102, 104, 106; therefore only the authorization function 108, 112, 116 can decrypt the authorization file 124 that may include one or more feature activation keys. Persons skilled in the art will appreciate that other types of encryption for items such as an authorization tile 124 that may include feature activation keys are within the scope of the aspects presented herein.

The local authorization server 128 may send the feature activation request to the authorization server 126. In some aspects, the feature activation request can be sent directly from the authorization function 108, 112, 116 to the authorization server 126 without first being sent to the local authorization server 128.

The authorization server 126 can send a response to the feature activation request after considering/evaluating/processing the authorization agreement 120 associated with the device such as Device A 102, Device B 104, or Device C 106. The response to the feature activation request may include authorization information that may be used to verify the right of the device 102, 104, 106 to activate the one or more selectively activated features identified in the feature activation request.

The response may also include an authorization file 124. The authorization file 124 may include one or more feature activation key(s), authorization parameters, or one or more feature activation key(s) and authorization parameters. Authorization parameters may include, for example, the expiration date/revocation date of the authorization. The local authorization server 128, or in some aspects the authorization server 126, may forward the authorization certificate 122 and the authorization file 124 including the feature activation key(s) and authorization parameters, to the authorization function 108, 112, 116.

As indicated above, to activate a selectively activated feature of a device 102, 104, 106 the selectively activated feature may need to be authorized. In accordance with one non-limiting example, an entity (e.g., a user, a service provider, OEM, manufacturer) may pay an authorization fee (e.g., a licensing fee) to activate the selectively activated feature to a licensing service based on terms defined in an authorization agreement 120. Before or after the payment is verified, the authorization agreement 120 may be uploaded to the authorization server 126 and/or a local authorization server 128. The authorization server 126 may be hosted by the licensing service. The authorization server 126 (e.g., a licensing server) may be used for validation, activation, and/or enforcement of the authorization agreement and/or selectively activated features associated therewith.

In one aspect, a device 102, 104 may determine that a network service is available. The device 102, 104 may identify selectively activated features that are available to the device (but not necessarily activated at the device) and that are needed to use the network service. Identification of selectively activated features needed to use the network service may be obtained from any suitable source such as, for example, a listing/table stored in the device 102, 104, a listing/table obtained from a local authorization server 128, a listing/table obtained from an authorization server 126, or may be obtained from a remote network node or other source (e.g., a node on a packet data network). The device 102, 104 may determine if it (i.e., the device 102, 104) is authorized to activate the selectively activated features that are needed to use the network service.

If the device 102, 104 is not authorized to activate all of the selectively activated features needed to use the network service, the device 102, 104, or authorization function 108, 112 of the device 102, 104, may request authorization to activate a selectively activated feature (or a plurality of selectively activated features). The device 102, 104, or authorization function 108, 112 of the device 102, 104, may request proof that the device 102, 104 is authorized to activate the requested selectively activated feature. Activation of the requested selectively activated feature may enable the device 102, 104, for example, to obtain a service offered on an application server or use a service provided by a network access node (e.g., eNB).

Exemplary Operating Environment

Figure 2:
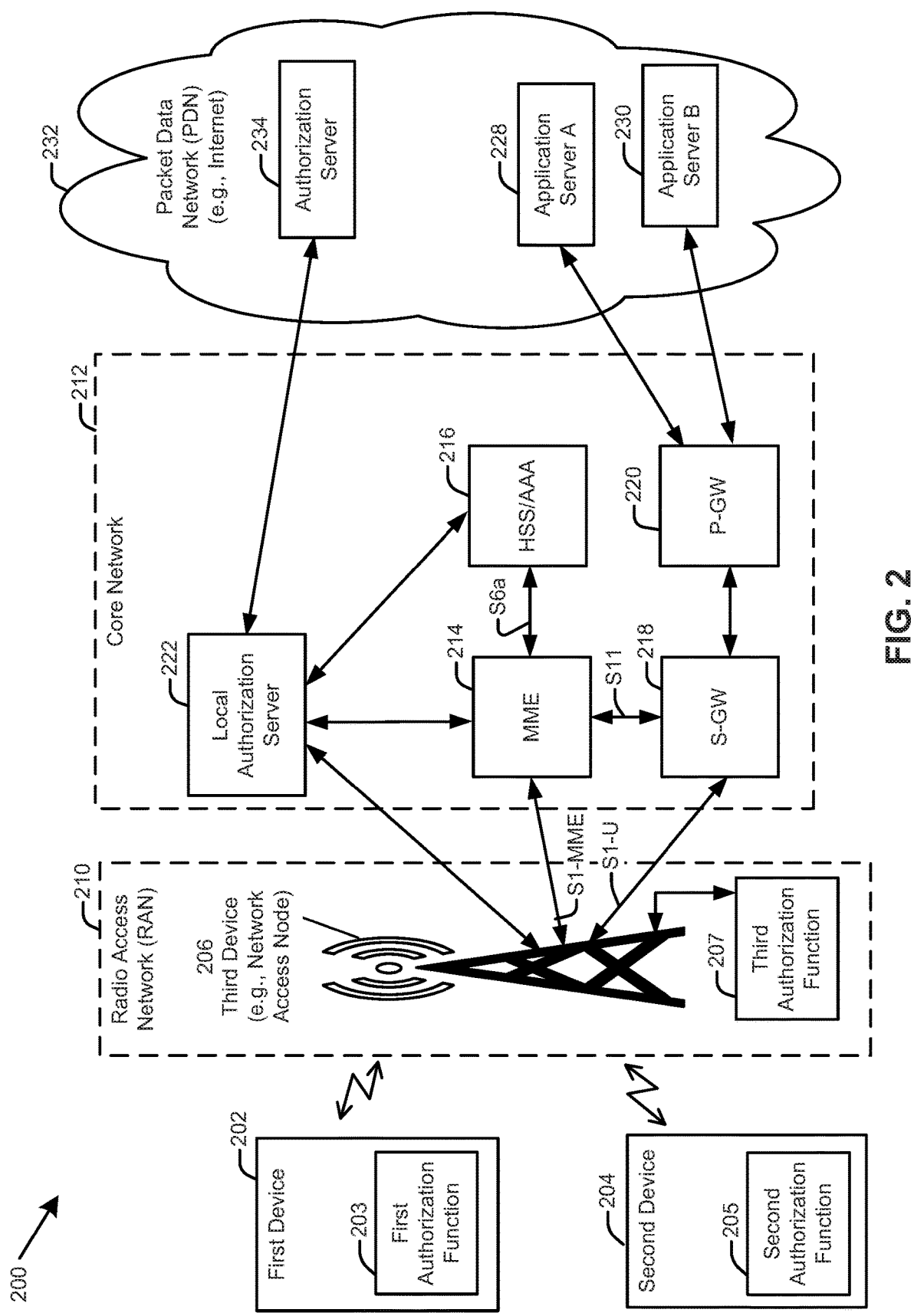
FIG. 2 illustrates an exemplary operating environment according to aspects described herein.

FIG. 2 illustrates an exemplary operating environment 200 according to aspects described herein. For ease of reference, and without any limiting intent, each authorization circuit/function/module will be referred to as an "authorization function" herein. In the exemplary operating environment 200, a first device 202 (e.g., chip component, client device, network node) includes a first authorization function 203. A second device 204 (e.g., chip component, client device, network node) includes a second authorization function 205. The first device 202 and the second device 204 may wirelessly communicate with a third device 206, depicted as a network access node (e.g., eNodeB). The third device 206 (e.g., network access node) may include a third authorization function 207.

The first device 202 may include one or more selectively activated features needed to use a first network service. The second device 204 may include one or more selectively activated features needed to use a second network service. The third device 206 may include one or more selectively activated features needed to use/provide the first network service to the first device 202 and/or the second network service to the second device 204.

The third device 206 (e.g., network access node) may be part of a radio access network (RAN) 210 (e.g., enhanced universal terrestrial radio access network (E-UTRAN)). In a non-limiting example of a cellular communication system (e.g., 4G, LTE, LTE-A, 5G) the RAN 210 may communicate control signaling and data traffic to a core network 212 (e.g., evolved packet core (EPC)). A network operator (e.g., a mobile network operator (MNO)) may operate the core network 212. Control signaling may be communicated via an S1-MME reference point. Data traffic may be communicated via an S1-U reference point.

The core network 212 may include a mobility management entity (MME) 214, a home subscriber server/authorization, authentication, and accounting server (HSS/AAA) 216, a serving gateway device (S-GW) 218, and a packet data network gateway device (P-GW) 220. In addition to the components identified above, the core network 212 may also include a local authorization server 222. The local authorization server 222 may communicate with the third device 206 (e.g., network access node) in the RAN 210 as well as other network access nodes (not shown). The local authorization server 222 may communicate with the first device 202 and the second device 204 via the third device 206 (e.g., network access node). Internal to the core network 212, the local authorization server 222 may communicate with the MME 214, and/or the HSS/AAA 216. The local authorization server 222 may serve as a proxy of the authorization server 234 to the first device 202, the second device 204, and the third device 206 (e.g., network access node) coupled to the core network 212 associated with the local authorization server 222.

The P-GW 220 may communicate with application servers 228, 230 on a packet data network (PDN) 232 (e.g., the Internet). The application servers 228, 230 may be associated with service providers such as, for example, a retail sales provider, an Internet search engine provider, an entertainment provider, and a social media service provider. The application servers 228, 230 may host applications and/or application services associated with the service providers.

The local authorization server 222 in the core network 212 may communicate with an authorization server 234 in the packet data network 232. It will be understood that the authorization server 234 could be located anywhere. In other words, it is optional to locate the authorization server 234 with the application servers 228, 230 on the packet data network 232. For example, a core network 212 may include the authorization server 234 in addition to the local authorization server 222.

The authorization server 234 may be accessed by the first device 202, the second device 204, the third device 206, as well as by any number of entities, such as radio access network providers, mobile network operators, or access point providers. Each entity may also maintain its own local authorization server. Aspects of authorization servers and local authorization servers will be provided below.

Architecture Reference Model

Figure 3:
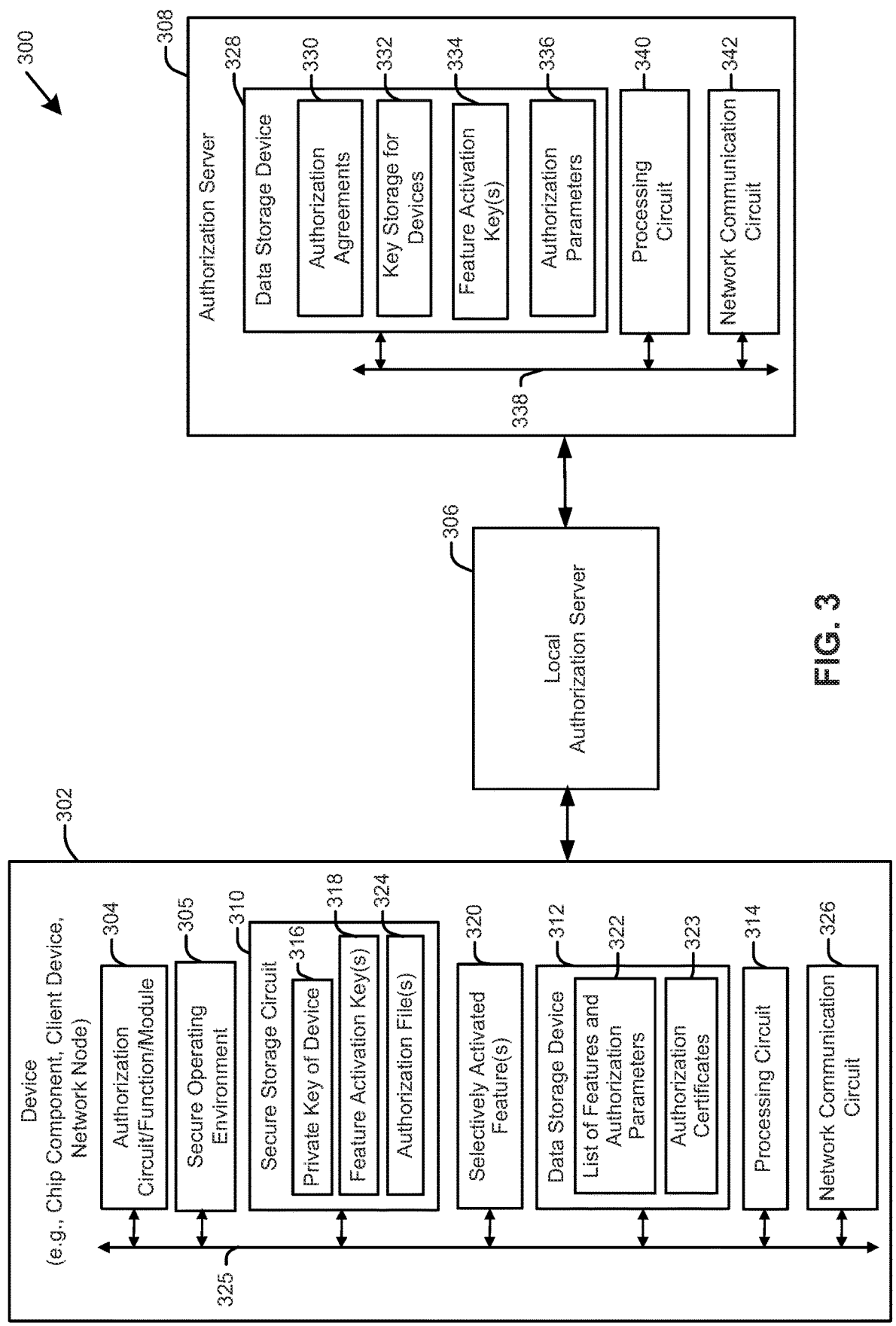
FIG. 3 is an architecture reference model of a system according to aspects described herein.

FIG. 3 is an architecture reference model of a system 300 according to aspects described herein. FIG. 3 illustrates a device 302 (e.g., chip component, client device, network node), a local authorization server 306, and an authorization server 308. The device 302 may include a least one selectively activated feature 320. The right of the device 302 to activate the selectively activated feature 320 may be based on an authorization agreement 330 (e.g., contract, agreement, license). In an aspect, the right of the device 302 to activate the selectively activated feature 320 may be based on validation of the authorization agreement 330 (or authorization information derived from the authorization agreement 330). In an aspect, the right of the device 302 to activate the selectively activated feature 320 may be based on a payment related to that selectively activated feature 320. In an aspect, a status of the payment related to the selectively activated feature 320 may be reflected in the authorization agreement 330 (or authorization information derived from the authorization agreement 330). In an implementation, the authorization server 308 may find utility at various instances in connection with a selectively activated feature 320, including, for example, during validation (e.g., of a right to use the selectively activated feature 320), activation (e.g., of the selectively activated feature 320), and enforcement (e.g., of terms of the authorization agreement 330 related to the selectively activated feature 320).

The device 302 may be coupled to a local authorization server 306. The local authorization server 306 may be coupled to an authorization server 308. The device 302, local authorization server 306, and authorization server 308 will now be described.

The device 302 may include an authorization circuit/function/module, which for ease of reference, and without any limiting intent, will be referred to as the "authorization function 304" herein.

The authorization function 304 may implement a secure process (e.g., perform secure processing) at a processing circuit 314 of the device 302 and/or at a secure operating environment 305 of the device 302. As used herein, the term "secure" may mean protected or safe from access by other processes including external and internal processes and/or from a user. In one aspect, a secure operating environment 305, and/or the secure process implemented therein, may be inaccessible to a user and/or inaccessible to processes other than the secure process implemented by the authorization function 304. In one aspect, where the authorization function 304 implements the secure process at the processing circuit 314 of the device 302, the secure process may be inaccessible to a user and/or inaccessible to processes other than the secure process implemented by the authorization function 304.

The authorization function 304 may implement a process to verify that the device 302 is authorized to activate the selectively activated feature 320 of the device 302. The process may be a secure process. In one aspect, to verify that the device 302 is authorized to activate the selectively activated feature 320, the authorization function 304 may obtain proof (e.g., authorization information) that the selectively activated feature 320 is authorized to be activated. The selectively activated feature 320 may be authorized to be activated for initial, repeated, and/or continued use. Verification may be by way of validating the obtained proof.

The authorization function 304 may also implement a process to verify that a network node (e.g., eNB, MME, S-GW, etc.), which is associated with a network to which the device 302 is attached, or plans to attach, is authorized to activate a feature corresponding to the selectively activated feature 320. The process may be a secure process. The feature corresponding to the selectively activated feature 320 at the network node may be used to facilitate a service offered by the network via the network node. By way of example, the device 302 may need the feature corresponding to the selectively activated feature 320 to be activated at the network node to use a network service provided at the network node. By way of additional example, the device 302 may need the feature corresponding to the selectively activated feature 320 to be activated at the network node to realize improved service that can be achieved by activating the selectively activated feature 320 at the device 302. For example, a device 302, which for the purposes of this example may be a client device, may be manufactured to implement carrier aggregation upon activation of the selectively activated feature 320. Carrier aggregation permits use of multiple carriers to increase transmission bandwidth. Carrier aggregation may improve the performance of the device 302. The device 302 may be authorized to activate the selectively activated feature 320 and may be authorized to configure itself to use carrier aggregation. However, to be effective, a network access node (e.g., eNB) coupled to the device 302 should also activate a corresponding feature such that the network access node is configured to use carrier aggregation. Therefore, in some aspects, a selectively activated feature 320 may be jointly activated and used by two devices (e.g., chip components, client devices, network nodes, or any combination of two or more thereof).

In an example, the authorization function 304 may activate and/or deactivate the selectively activated feature 320 in accordance with terms defined in the authorization agreement 330 (and reflected in authorization information derived from the authorization agreement 330 and obtained at the authorization function 304). In the example, the terms upon which activation and use are acceptable may be defined by, or listed in, the authorization agreement 330. In the example, the terms may include payment in exchange for a right to use the selectively activated feature 320. In an implementation, the authorization function 304 of the device 302 may find utility at various instances in connection with the selectively activated feature 320 associated with the device 302, including, for example, during validation (e.g., of a right to use the selectively activated feature 320), activation (e.g., of the selectively activated feature 320), and enforcement (e.g., of terms of the authorization agreement 330 related to the selectively activated feature 320). In some aspects, activation of the selectively activated feature 320 could allow the device 302 to obtain services from, for example, an application server on a network (e.g., the Internet) via another device (such as an eNB).

The device 302 may also include a secure storage circuit 310 (e.g., a circuit/function/module). In one aspect, the secure storage circuit 310 may be considered secure based on an ability of components entities (internal and/or external to the device 302) to read and write data from and to the secure storage circuit 310. In one aspect, the secure storage circuit 310 may be permanently incorporated into, or integrated with, the device 302. For example, the secure storage circuit 310 may comprise a non-volatile memory array fabricated on the same substrate as a processing circuit 314 included with the device 302.

Within the secure storage circuit 310 there may be storage space for a private key 316 of a private/public key pair derived for the device 302. In one aspect, a manufacturer or OEM may generate the private/public key pair. In another aspect, another entity may generate the private/public key pair. The private key 316 of the private/public key pair may be stored in the secure storage circuit 310 by the manufacturer, OEM, or by another entity. In one aspect, the private key 316 may be stored in the secure storage circuit 310 before transfer of ownership of the device 302 from the manufacturer or OEM to a third entity. In other aspects, the private key 316 may be stored in the secure storage circuit 310 at any time and by any entity. In some aspects, the private key 316 is only known to the device 302. In some aspects, the private key 316 is only known to the authorization function 304 of the device 302.

The private key 316 may be used by the device 302 (or the authorization function 304) to decrypt feature activation keys 318 and/or authorization files that may include feature activation keys 318. The feature activation keys 318 and/or authorization files that may include feature activation keys 318 may be signed/encrypted by a third entity (e.g., the authorization server 308) using the public key of the device 302 prior to sending the feature activation keys 318 to the device 302.

In an aspect, a feature activation key 318 may be used to activate a selectively activated feature 320 of the device 302. In aspects described herein, feature activation keys 318 may be stored in an encrypted form. In some examples, feature activation keys 318 may only be decrypted by the authorization function 304 (e.g., using the private key 316 of the device 302). In some examples, feature activation keys 318 may be stored in a secure environment, such as the secure storage circuit 310.

The device 302 may further include a data storage device 312 (e.g., circuit/function/module), which may be separate from the secure storage circuit 310. In one aspect, the secure storage circuit 310 could be a partition of the data storage device 312, or vice versa. The secure storage circuit 310 and/or data storage device 312 may comprise, for example, a hard disk, a partition of a hard disk, an optical disk, a partition of an optical disk, a solid state memory, or a partition on a solid state memory.

Within the data storage device 312, there may be stored a list of features and authorization parameters 322. For example, the list of features and authorization parameters 322 may identify the selectively activated feature 320 that the device 302 has authority to activate/deactivate, and their associated authorization parameters. The list of features and authorization parameters 322 may be compiled from, for example, one or more authorization files signed by the authorization server (where signing may be used to validate the authorization files). The authorization files may be obtained from the local authorization server 306 or the authorization server 308, for example, upon device activation, device handover, device update, or in response to a request from the device 302. The authorization parameters, in the list of features and authorization parameters 322, may indicate, for example, whether the selectively activated feature 320 is activated or deactivated and a date upon which authority of the device 302 to use selectively activated feature 320 expires or is revoked. As used herein, authority of the device 302 to use a selectively activated feature 320 encompasses authority of the device 302 to provide the selectively activated feature 320.

Within the data storage device 312, there may also be stored authorization certificates 323. In an aspect, authorization certificates 323 may be verified by any entity and therefore need not be stored in a secure storage. On the other hand, authorization file(s) 324 includes private information such as feature activation keys. Therefore, in an aspect, authorization file(s) 324 may be stored in the secure storage circuit 310.

The device 302 may also include a communications bus 325 to provide for communications between the authorization function 304, the secure operating environment 305, the secure storage circuit 310, the data storage device 312, the processing circuit 314, and/or a network communication circuit 326 included with the device 302. The network communication circuit 326 may also provide for communication with the local authorization server 306 and/or the authorization server 308.

In some aspects, the local authorization server 306 may act as a local proxy to the authorization server 308. In some aspects, the local authorization server 306 may send proof of authority for the device 302 to use a set of selectively activated features 320 at the device 302, signed by the local authorization server 306, where the device 302 may be coupled to the core network associated with the local authorization server 306. In some aspects, the local authorization server 306 may temporarily operate independently of the authorization server 308. Whether the local authorization server 306 acts as a local proxy to the authorization server 308 or a local server per se may be, for example, a function of the terms of the authorization agreement 330 stored at the authorization server 308.

The authorization server 308 may include a data storage device 328 (e.g., a circuit/function/module). The data storage device 328 may store a listing, repository, or record of authorization agreements 330 (e.g., agreements, contracts, licenses). The authorization agreements 330 may relate to various selectively activated features of a plurality of devices. The data storage device 328 may maintain key storage 332 for devices that are covered by authorization agreements 330. The key storage 332 may include private keys and/or public keys that may be used to encrypt messages sent to devices (such as device 302) that are covered by authorization agreements 330.

The data storage device 328 of the authorization server 308 may also include feature activation key(s) 334 that may be used to activate the selectively activated feature(s) 320 of the device 302. In some aspects, feature activation key(s) 334 can be sent from an authorization server 308 (or a local authorization server 306) to the device 302 when the authorization function 304 of the device 302 requests proof that the device 302 has authority to activate one or more of the selectively activated feature(s) 320. In such aspects, the selectively activated feature(s) 320 may be activated by (or on authority of) the authorization function 304, after the authorization server 308 (or the local authorization server 306) sends proof (e.g., authorization information the authorization function 304 that the device 302 has authority to activate the selectively activated feature(s) 320.

In an example, the data storage device 328 of the authorization server 308 may store a listing, repository, or record of authorization parameters 336 for each selectively activated feature 320 at the device 302 as a function of a device model number. In one aspect, to permit differentiation of individual devices having the same model number, for example, the data storage device 328 may store the authorization parameters 336 for each selectively activated feature 320 as a function of a device serial number, or other device identifier such as an International Mobile Station Equipment Identity (IMEI). As known to those of skill in the art, the IMEI is a unique number that is used to identify hardware in accordance with Third Generation Partnership Project (3GPP) systems (e.g., GSM, UMTS, LTE, LTE-A).

The authorization server 308 may also include a communications bus 338 to provide for communications between the data storage device 328, a processing circuit 340, and/or network communication circuit 342 included with the authorization server 308. The network communication circuit 342 may also provide for communication with the local authorization server 306 and/or the device 302.

As indicated above, the local authorization server 306 may serve as a proxy for the authorization server 308. As such, the local authorization server 306 includes the same or similar circuits/functions/modules as that of the authorization server 308. The description and illustration of the same or similar circuits/functions/modules will therefore be omitted.

Authorization Agreements

Returning to FIG. 1, authority of a device 102, 104, 106 to use a set of selectively activated features 110, 114, 118 may be given in an authorization agreement 120 (e.g., agreement, contract, license). In some aspects, the authorization agreement 120 may be considered a license. As used herein, in an aspect, a reference to a set of selectively activated features, or a reference to selectively activated feature(s), may be understood to be a reference to one selectively activated feature (e.g., where the set includes one selectively activated feature or the set includes one or more distinct selectively activated features). The authorization agreement 120 may be used as proof, or the authorization agreement 120 may be used to derive proof, of authority of a device 102, 104, 106 to use (e.g., activate, maintain activation of) a set of selectively activated features 110, 114, 118 at the device 102, 104, 106.

The authorization agreement 120 may be established between two or more entities. The entities to an authorization agreement 120 may, for example, claim rights to the device, a feature of the device, and/or a service to be used by the device. By way of example, an authorization agreement 120 may established between a manufacturer, vendor/OEM, the device purchaser, re-seller, licensing service, and/or any two or more of the manufacturer, vendor/OEM, the device purchaser, re-seller, or licensing service. The device purchaser may be an end user, a reseller, or an entity that will lease the device. A licensing service may be an organization that grants licenses and monitors compliance with licensing terms.

In an example, the authorization agreement 120 may be established in advance of a time when an authorization function 108, 112, 116 seeks to obtain proof of the authorization agreement 120. In another example, the authorization agreement may be established at the same time, or substantially the same time, as when an authorization function 108, 112, 116 seeks to obtain proof of the authorization agreement 120.

The authorization agreement 120 may be referred to as a writing. As used herein, a writing includes all non-transient machine readable expressions of authorization agreements, regardless of whether such authorization agreements ever existed in a physical human-readable form. The term "writing" includes any human-readable document reduced to any form that can be read by a machine. Forms that can be read by a machine may include electrical, optical, magnetic, or other storage forms known to those of skill in the art.

In one example, the authorization agreement may be used to derive an authorization certificate that includes:

1. a set of selectively activated features authorized for use;
2. lifetime/expiration time;
3. location where the selectively activated features are enabled (including, for example, geographic or network identifiers such as PLMN, SSIDs, or cell IDSs);
4. maximum number of network access nodes that can use the selectively activated features; and
5. periodic usage reporting requirements.

FIG. 4 illustrates an exemplary list 400 of parameters and data that may be included an exemplary authorization agreement between a first entity (e.g., an owner of a device, seller/re-seller of the device, service provider that offers the device to customers with or without a discount) and a manufacturer or OEM of one or more devices in accordance with aspects described herein. The listing is presented in tabular form in FIG. 4, however, any machine readable (e.g., processing circuit readable) form is acceptable according to this aspect. The listing includes parameters, such as the date of an agreement 402, an identifier of an owner 404 of the device, an identifier of the manufacturer or OEM 406 of the device, an identifier of the device 408 (e.g., an IMEI number), a list of authorized features 410, the duration of the authorization agreement 412, limitations on use of the features 414, and a fee for use of the features 416.

FIG. 5 illustrates an exemplary list 500 of parameters and data that may be included in an exemplary authorization agreement between a manufacturer or OEM and another entity (e.g., an entity operating an authorization server) in accordance with aspects described herein. The listing is presented in tabular form in FIG. 5, however, any machine readable (e.g., processing circuit readable) form is acceptable according to this aspect. The listing includes parameters, such as the starting date of an agreement 502, the ending date of the agreement 504, an identifier of the device 506 (e.g., an IMEI number), a list of authorized features 508, limitations on use of the features 510, an identifier of the public key 512 of the device, an identifier of the manufacturer or OEM 514 of the device, and a fee for use of the features 516.

FIG. 6 illustrates an exemplary listing 600 of parameters and data that may be included in an exemplary authorization agreement between a network operator a mobile network operator (MNO)) and another entity owner/operator of the authorization server) in accordance with aspects described herein. The exemplary listing 600 is presented in tabular form in FIG. 6, however, any machine readable (e.g., processing circuit readable) form is acceptable according to this aspect. The exemplary listing 600 includes parameters such as the starting date of the authorization agreement 602, the ending date of the authorization agreement 604, an identifier of the device 606 (e.g., an IMEI number), a list of authorized service(s) 608, a list of authorized features 610, an identifier of the manufacturer or OEM of the device 612, and a fee for use of the features 614.

Provisioning

Figure 7:
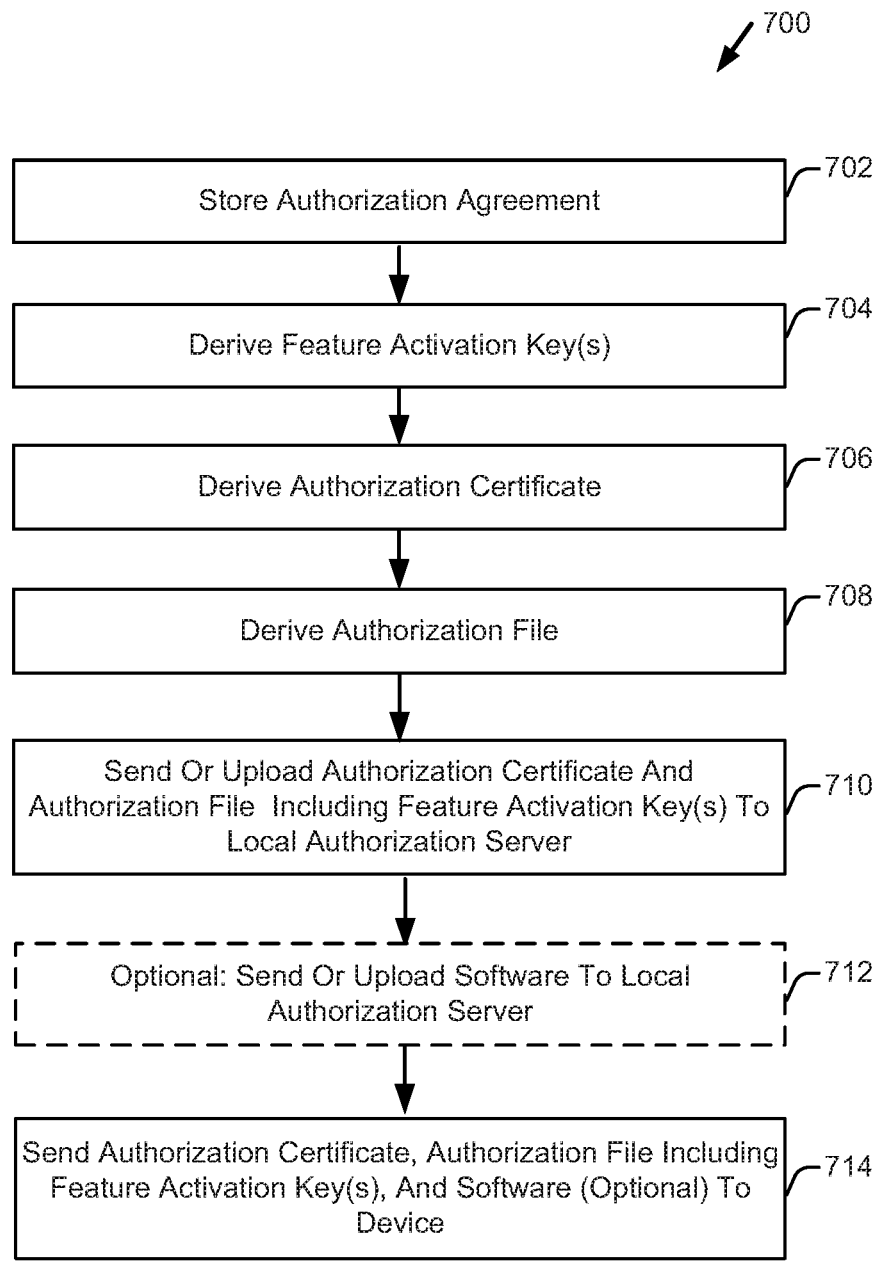
FIG. 7 is a flow diagram illustrating actions related to sending of authorization certificates, authorization files, feature activation keys, and software to devices in accordance with aspects described herein.

FIG. 7 is a flow diagram illustrating actions related to sending of authorization certificates, authorization tiles, feature activation keys, and software to devices chip components, client devices, network nodes) in accordance with aspects described herein. In one aspect, actions identified with reference numbers 702-712 may be taken by an authorization server, while the action identified with reference number 714 may be taken by a local authorization server. In one aspect, actions identified with reference numbers 702-714 may be taken by the authorization server. That is, in such aspects, the authorization server may derive and send an authorization certificate, authorization file, feature activation key(s), and/or software to a device without intervention of the local authorization server. In one aspect, actions identified with reference numbers 702-714 may be taken by the local authorization server. That is, in such aspects, the local authorization server may derive and send the authorization certificate, authorization file, feature activation key(s), and/or software to the device without intervention of the authorization server.

As described above, authorization agreements may be entered into between various entities (e.g., an owner of a device, seller/re-seller of the device, service provider that offers the device to customers with or without a discount, a manufacturer, or OEM of a device). For example, one entity may pay a second entity a fee for a right to use a service or selectively activated feature for a predefined time (e.g., quarterly). Once the entities have entered into the authorization agreement, the authorization agreement may be stored 702 on an authorization server. The authorization server may derive feature activation keys(s) 704 based on information in the authorization agreement (e.g., derive feature activation keys(s) 704 based on the authorization agreement). The authorization server may derive an authorization certificate 706 based on information in the authorization agreement. The authorization server may also derive an authorization file 708 based on information in the authorization agreement. In some aspects, the authorization file may include one or more feature activation keys. The order of these actions is exemplary and not limiting. Any order is acceptable.

A feature activation key may be used to activate a selectively activated feature of a device (e.g., chip component, client device, network node). The feature activation key may be encrypted, and/or the authorization tile having the feature activation key(s) therewith may be encrypted. In some examples, the feature activation key(s) and/or authorization file may only be decrypted by the authorization function of the device.

In some aspects, one feature activation key per selectively activated feature may be used for selectively activated feature activation. In other aspects, one feature activation key may be used to activate multiple selectively activated features. Activating a selectively activated feature may include an initial activation of the selectively activated feature as well as maintaining activation of an already activated selectively activated feature. In one aspect, a feature activation key may unlock a selectively activated feature. By way of example, a selectively activated feature may be activated, but may be locked from use based on terms of the authorization agreement (e.g., the selectively activated feature may be locked from use based on a geographic or time-related parameter limitation imposed by the authorization agreement). The activated selectively activated feature may be unlocked (e.g., the ability of the device to use the already activated selectively activated feature may be enabled) based on obtaining and using of an appropriate feature activation key.

An authorization file may include data relevant to a selectively activated feature. Data relevant to a selectively activated feature may include, for example, the date upon which authority of the device to use the selectively activated feature expires or is revoked. Other data relevant to the selectively activated feature may also be included in the authorization file.

In one aspect, the authorization server may send or upload 710 (e.g., provision) the authorization certificate and the authorization file including feature activation key(s) to a local authorization server. The authorization server may optionally send or upload software 712 related to selectively activated features of a device, or any feature (hardware or software) related to the device, to the local authorization server. For example, software in the form of an updated driver may be sent or uploaded in addition to the authorization certificate and authorization file.

The authorization server and/or local authorization server may send 714 the authorization certificate, authorization file including feature activation key(s), and software (optional), to a device (e.g., chip component, client device, network node) in response, for example, to obtaining a feature activation request from the device.

In an example, when multiple devices are included in an authorization agreement, the local authorization server may ensure that no more than a maximum number of devices (e.g., a quota) using an authorized selectively activated feature. For example, the local authorization server may receive an indication when a selectively activated feature is deactivated at a first device before the local authorization server issues an authorization to activate the selectively activated feature at a second device. Alternatively, the local authorization server may revoke an authorization to activate a selectively activated feature at a first device before the local authorization server issues an authorization to activate the selectively activated feature at a second device. The revocation may be based, for example, on a periodic reporting from all authorized devices to determine in which devices the selectively activated feature is being actively used.

Feature Activation Request

Figure 8:
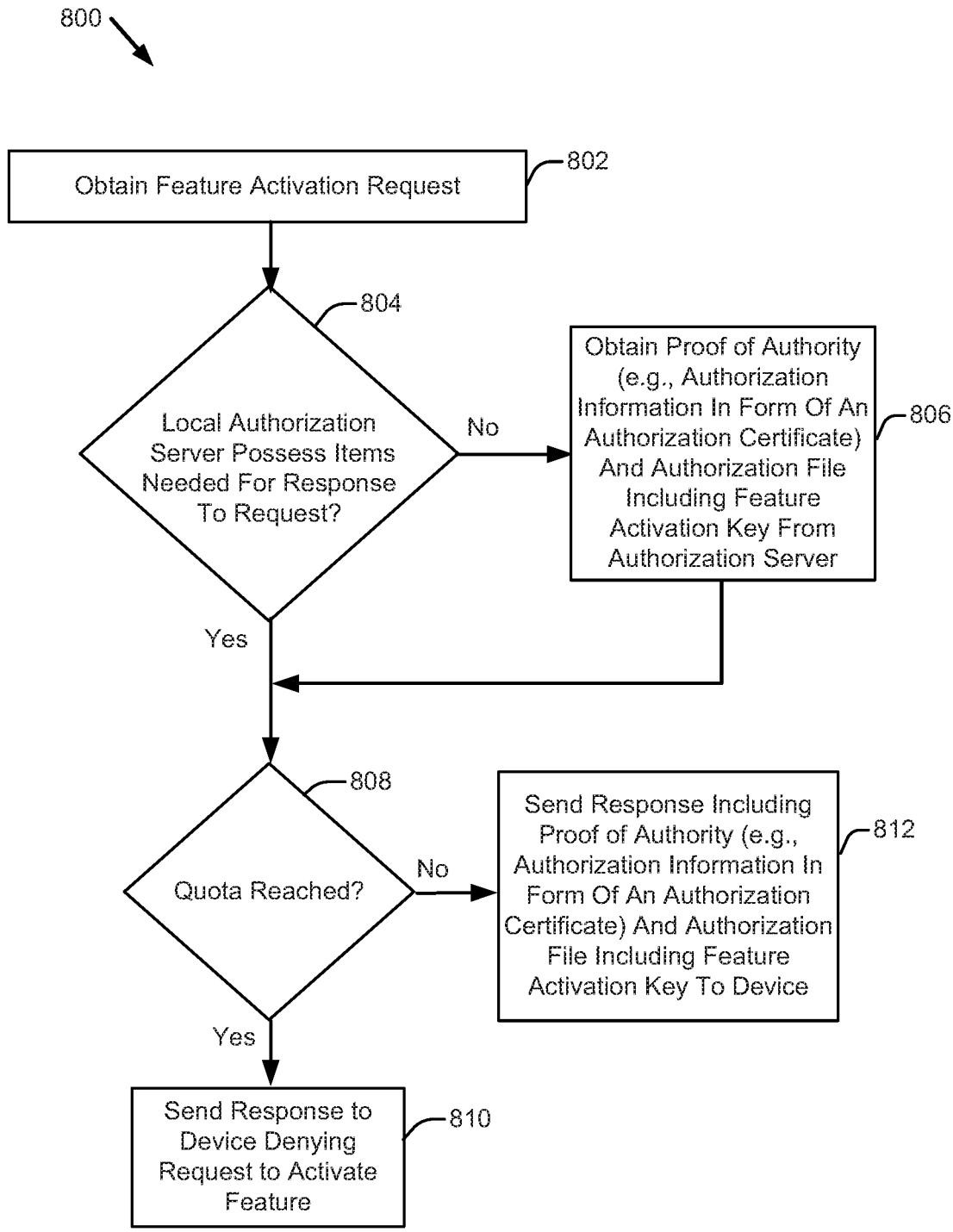
FIG. 8 is a flow diagram illustrating a method involving a feature activation request in accordance with aspects described herein.

FIG. 8 is a flow diagram 800 illustrating a method involving a feature activation request (e.g., a request to activate one or more features, a request for authorization to activate one or more features) in accordance with aspects described herein. A device (e.g., a chip component, client device, network node) may activate a selectively activated feature if the device has authorization to do so. Various events may result in the device sending a feature activation request. For example, the selectively activated feature may be needed to use a network service, an administrator may determine to configure the device in a way that invokes the selectively activated feature, a subscription update may occur, and/or an operation, administration, and management (OAM) protocol may need to activate the selectively activated feature for maintenance purposes.

To activate the selectively activated feature, the device may obtain proof of authority for the device to use the selectively activated feature at the device, and obtain an authorization file including feature activation key(s). Proof of authority may be provided, for example, in the form of authorization information. The authorization information may include the authorization agreement and/or an authorization certificate. In an example, to obtain the proof of authority for the device to use the selectively activated feature and the authorization file including feature activation key(s), the device may send a feature activation request a request to activate one or more selectively activated features) to a local authorization server.

The local authorization server may obtain 802 the feature activation request from the device. The local authorization server may determine 804 if the local authorization server possesses items needed for a response to the request (e.g., a proof of authority for the device to use a set of selectively activated features at the device, such as authorization information, and an authorization file including feature activation key(s)). If the local authorization server does not possess the items needed, or if the local authorization server possesses the items but the items are not valid (e.g., due to expiration of an authorization), the local authorization server may attempt to obtain 806 the proof of authority (e.g., authorization information in the form of an authorization certificate) and the authorization file including feature activation key(s) from an authorization server.

In one aspect, the local authorization server may obtain 806 the proof of authority (e.g., authorization information in the form of an authorization certificate) and the authorization file including feature activation key(s) from the authorization server by forwarding the feature activation request to the authorization server. The authorization server may send the proof of authority (e.g., authorization information in the form of an authorization certificate) and the authorization file including feature activation key(s) if, for example, an authorization agreement confirms that the requested selectively activated features are authorized. In the case where the feature activation request is sent to the authorization server, the local authorization server may act as a proxy server that provides a secure tunnel between the device (e.g., chip component, client device, network node) and the authorization server. After verifying the authorization agreement (e.g., between the device and a licensing service and/or between the mobile network operator and the licensing service), the authorization server may send the proof of authority (e.g., authorization information in the form of an authorization certificate) and the authorization file including feature activation key(s) to the local authorization server.

If the local authorization server possesses the proof of authority (e.g., authorization information in the form of an authorization certificate) and the authorization file, the local authorization server may determine 808 if a quota is reached for the requested selectively activated feature. If the quota for the requested selectively activated feature is reached, the local authorization server may send a response to the device denying 810 the request to activate the selectively activated feature. A reason for the denial may be included with the response. If the quota for the requested selectively activated feature is not reached, the local authorization server may send a response to the device 812 including, for example, the proof of authority (e.g., authorization information in the form of an authorization certificate) and the authorization file including feature activation key(s).

A local authorization server may cache authorization agreements, authorization certificates, authorization files, feature activation key(s), and optional software for future use. In an aspect, the caching may apply when the local authorization server issues an authorization certificate on behalf of the authorization server and reports the authorization status to the authorization server.

Activation of Selectively Activated Features

Figure 9:
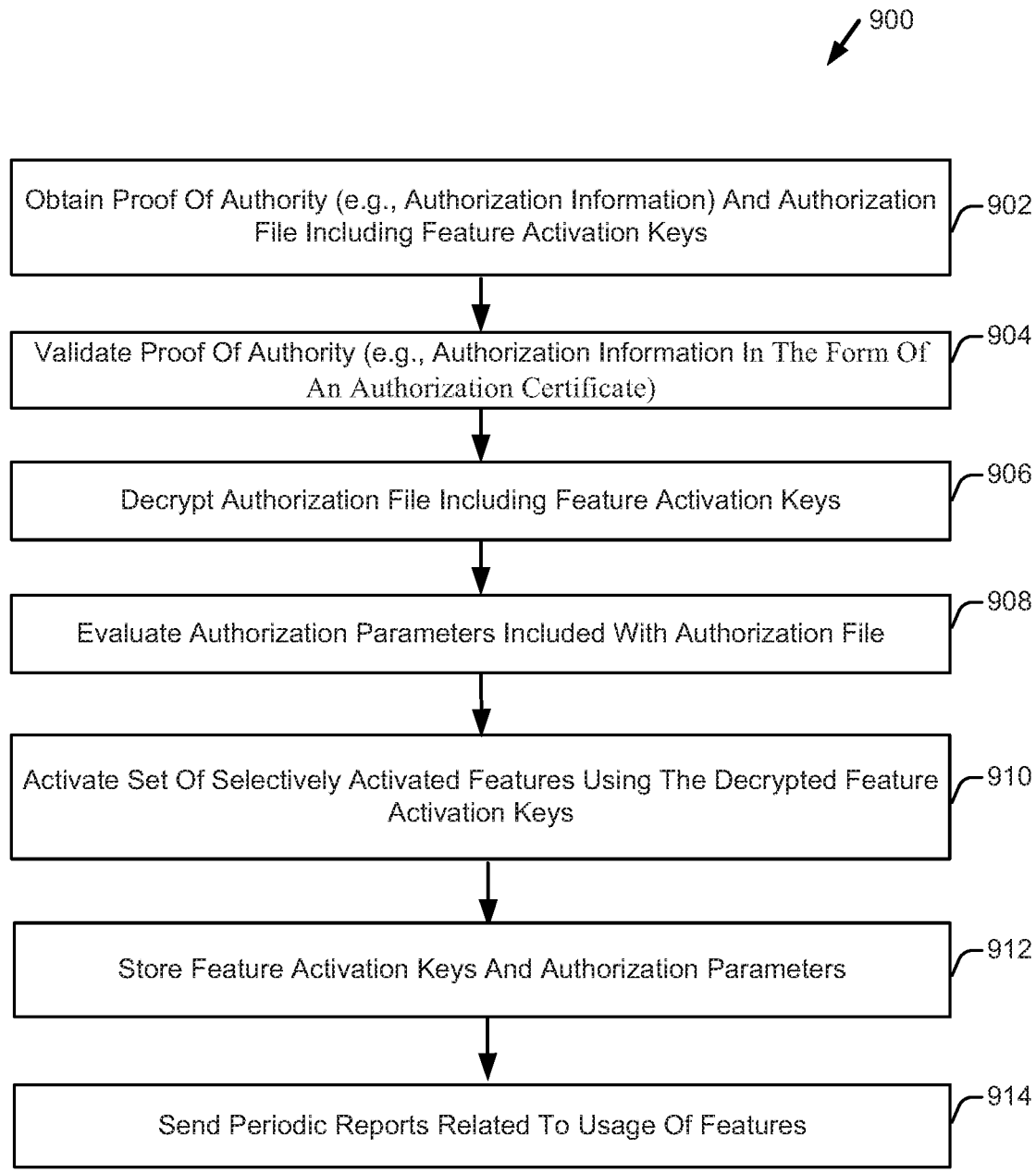
FIG. 9 is a flow diagram illustrating one example of activation of selectively activated features in accordance with aspects described herein.

FIG. 9 is a flow diagram 900 illustrating one example of activation of selectively activated features in accordance with aspects described herein. A device (e.g., chip component, client device, network node), or an authorization function of the device, may obtain 902 proof of authority (e.g., authorization information in the form of an authorization certificate) of the device to use a set of selectively activated features at the device, where the proof of authority is signed by an authorization server, and may also obtain an authorization file including feature activation keys. In one aspect, the proof of authority and authorization file may be obtained in response to a feature activation request (e.g., a request to activate one or more selectively activated features). The authorization file may include feature activation keys encrypted with the public key of the device. The authorization function may validate 904 the proof of authority (e.g., authorization information in the form of an authorization certificate). In one aspect, validation may include using a validation function and the public key of the authorization server. If the proof of authority (e.g., authorization information in the form of an authorization certificate) is validated, the device may decrypt 906 the authorization file including feature activation keys using a private key of the device. The authorization function may retrieve the feature activation keys from the decrypted authorization file. The authorization function may evaluate 908 authorization parameters included with the authorization file (e.g., confirm that authorization parameters, such as an expiration date of the authority of a device to use a selectively activated feature, are not expired). The authorization function may then activate the set of selectively activated features 910 using the decrypted feature activation keys.

Any activated selectively activated feature may remain activated until a deactivation event occurs. One example of a deactivation event could be the reaching of an expiration time specified in the authorization parameters associated with the activated selectively activated feature. Other deactivation events are acceptable. The authorization function may store 912 the retrieved feature activation key at a secure storage device of the device. The authorization function may also store 912 the retrieved authorization parameters at a data storage device of the device.

In one example, the authorization function of the device may be able to decrypt the authorization file reliably and with good assurance of security at least because the authorization server may have encrypted the authorization file using a public key (of a public/private key pair) of the device, the device may have stored the private key in the secure storage circuit of the device, and the private key may be only known to the authorization function. The device may rely on the authorization function to ensure that activation of the selectively activated feature(s) is appropriate. Additionally, when the device receives an authorization certificate from the network (e.g., authorization server), the device should be able to verify that the authorization certificate is a correct authorization certificate sent by the authorization server (e.g., not sent by an imposter). In one example, to facilitate the ability of the device to verify that the authorization certificate is a correct authorization certificate sent by the authorization server, the authorization server can add a signature of the authorization server (derived with a private key of the authorization server) to the authorization certificate. The signature of the authorization server may be verified at the device using the public key of the authorization server. Similarly, when the device receives an authorization file from the network (e.g., authorization server), the device should be able to verify that the authorization file is a correct authorization file sent by the authorization server (e.g., not sent by an imposter). In one example, to facilitate the ability of the device to verify that the authorization file is a correct authorization file sent by the authorization server, the authorization server can add a signature of the authorization server (e.g., a signature derived with a private key of the authorization server) to the authorization file. The signature of the authorization server may be verified at the device using the public key of the authorization server.

The device may monitor the usage of the activated selectively activated feature and may send 914 periodic reports related to the usage of the selectively activated features (e.g., report the activation status) to the authorization server and/or the local authorization server. The authorization server and/or the local authorization server may aggregate the reports related to the usage of selectively activated features from all devices that send such reports. A report on the usage status of the selectively activated features may be referred to herein as a status report. Periodic status reports may be used, for example, to enforce limitations on the rights of devices to use selectively activated features. For example, an authorization server (or local authorization server) may use data obtained from the status reports to verify that greater than a maximum number of devices are, or are not, concurrently using a selectively activated feature. If greater than a maximum number of devices are concurrently using the selectively activated feature (e.g., a quota is reached), new requests to activate the selectively activated feature may be denied. Records relating to usage, license fees, etc. may be derived and maintained.

Orchestration Procedure

In one aspect, upon successful feature activation at a device (e.g., chip component, client device, network node), the authorization server may transmit data to an HSS/AAA server associated with the device to inform the HSS/AAA server of the updated features/updated capability of the device.

The HSS/AAA server may update a subscription profile of the device and may send the information to network nodes (e.g., eNodeB, MME, P-GW, etc.) after the updated device features are verified by a network operator (e.g., an MNO). In some aspects, it can be the role of the network operator to update a subscription profile based on the capability and authorization status of the device.

Updating the subscription profile of the device, once the request to activate one or more features is approved and/or the features are activated, may permit a network node (e.g., eNB, MME, S-GW, P-GW) to validate the authorization of a device to use a feature without a need for the network node to obtain another form of proof. For example, updating the subscription profile to permit the network node to validate the authorization of the device to use the feature based on the subscription profile and may obviate a need of the network node to obtain, from the device, proof of authority for the device to use a set of selectively activated features at the device.

In one aspect, when the device is a network access node (e.g., an eNodeB), information concerning the availability of a certain set of features/services that are activated at the network access node may be sent to a device. In some implementations, the certain set of features/services that are activated at the network access node may be announced to devices (e.g., chip components, client devices) via an over-the-air broadcast a system information block (SIB) Type 1 broadcast). In some implementations, a device may use a protocol to query the network access node, and thereby may determine the availability of the certain set of features/ services that may be activated at the network access node. One example of such a query protocol may be an access network query protocol (ANQP). Other query protocols are acceptable. In these exemplary ways, a device may become aware of the features/services available from the network access node so that the device can determine if the device wants to make use of the features/services after mutual authentication.

Exemplary Authorization Server

Figure 10:
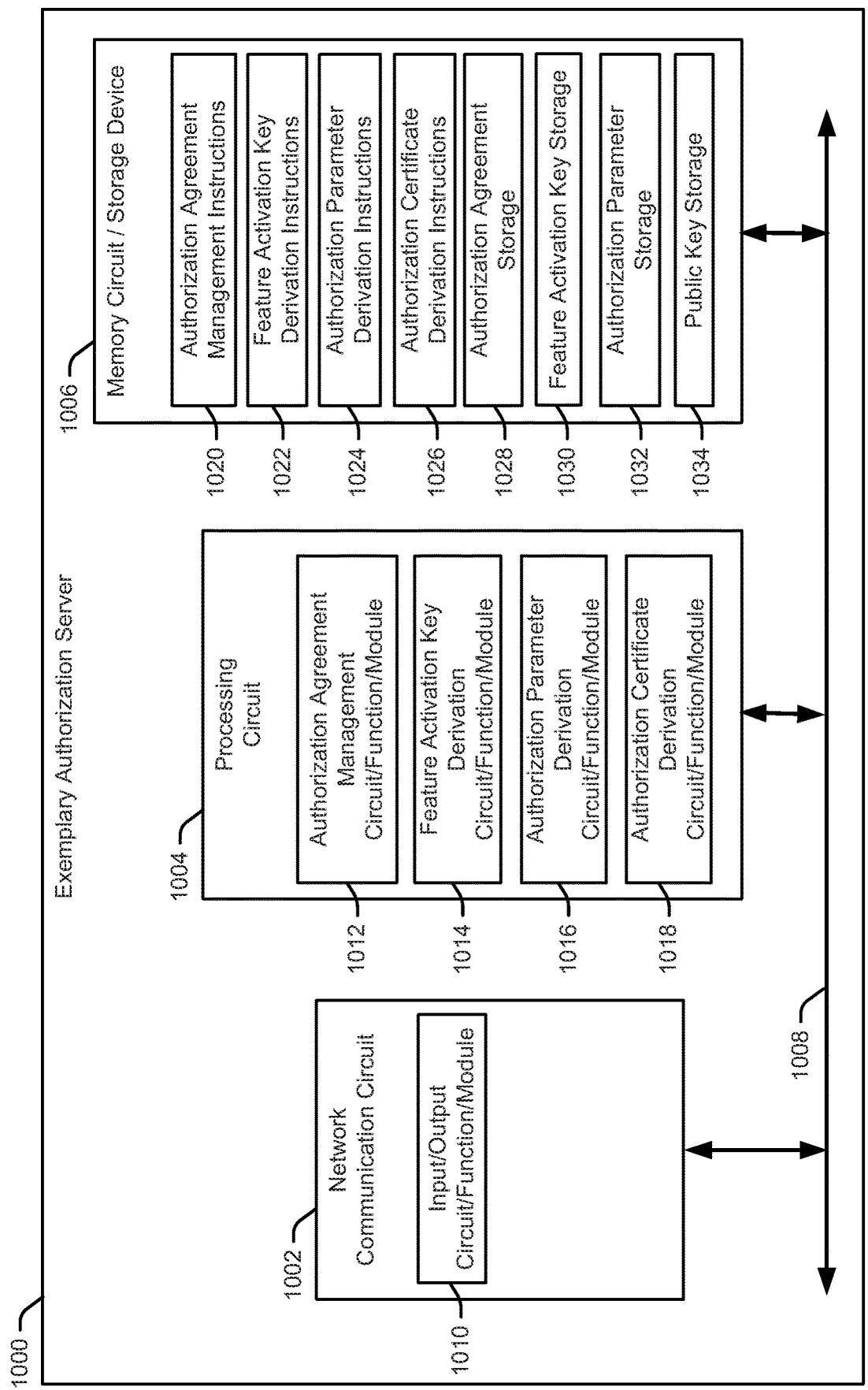
FIG. 10 is a block diagram illustrating an authorization server configured to support dynamic verification and enforcement of authorization agreements in accordance with aspects described herein.

FIG. 10 is a block diagram illustrating an authorization server 1000 configured to support dynamic verification and enforcement of authorization agreements in accordance with aspects described herein. In one example, the authorization server 1000 may include a network communication circuit 1002, a processing circuit 1004, and a memory circuit/storage device (referred to herein as memory circuit 1006). The network communication circuit 1002, processing circuit 1004, and memory circuit 1006 may be coupled to a communication bus 1008 for exchange of data and instructions.

The network communication circuit 1002 may be configured to include an input/output module/circuit/function 1010 for communication with network nodes such as a P-GW device, a local authorization server, and/or a network access node. Other circuits/functions/modules may be included in the network communication circuit 1002 of the authorization server 1000 as will be appreciated by those of skill in the art.

The processing circuit 1004 may be configured to include or implement one or more processors, application specific processors, hardware and/or software modules, etc., that are configured to support dynamic verification and enforcement of authorization agreements. The processing circuit 1004 may include an authorization agreement management circuit/function/module 1012, which may manage the collection, maintenance, and organization of authorization agreements stored in the authorization server 1000. The processing circuit 1004 may include a feature activation key derivation circuit/function/module 1014, which may be used to derive feature activation keys that may be used to activate selectively activated features of devices (e.g., chip components, client devices, network nodes). The processing circuit 1004 may include an authorization parameter derivation circuit/function/module 1016, which may be used to derive authorization parameters (e.g., expiration date of an authorized selectively activated feature) that may be passed to devices along with feature activation keys. The processing circuit 1004 may include an authorization certificate derivation circuit/function/module 1018, which may derive an authorization certificate based on an authorization agreement and may sign the authorization certificate with a private key of the authorization server 1000. Other circuits/functions/modules may be included in the processing circuit 1004 of the authorization server 1000 as will be appreciated by those of skill in the art.

The memory circuit 1006 may be configured to include authorization agreement management instructions 1020, feature activation key derivation instructions 1022, authorization parameter derivation instructions 1024, authorization certificate derivation instructions 1026, as well as space for feature activation key storage 1030, authorization parameter storage 1032, public key storage 1034, and authorization certificate storage 1036. Other instructions and locations for storage of data may be included in the memory circuit 1006 as will be appreciated by those of skill in the art.

Exemplary Local Authorization Server

Figure 11:
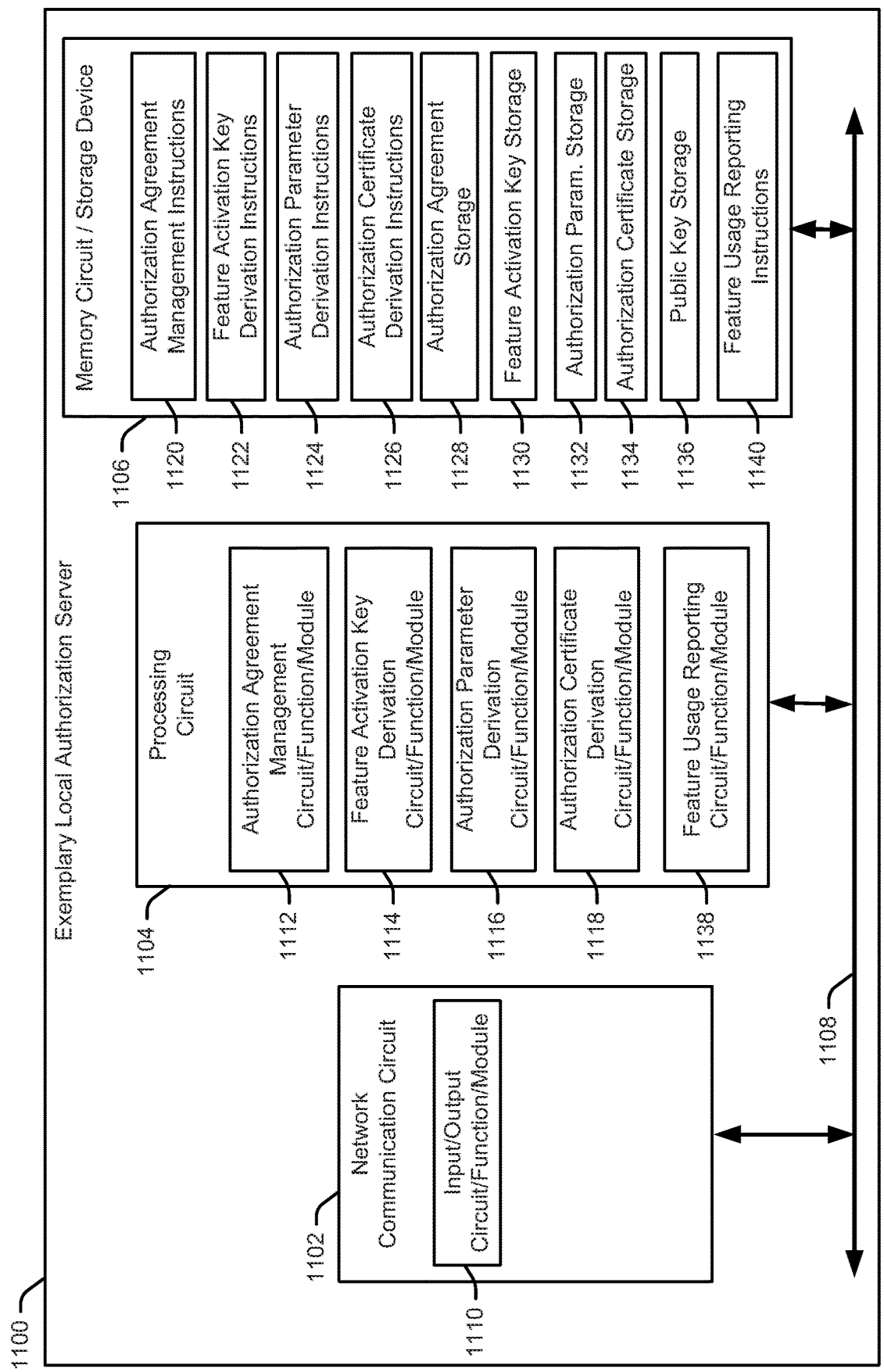
FIG. 11 is a block diagram illustrating a local authorization server configured to support dynamic verification and enforcement of authorization agreements in accordance with aspects described herein.

FIG. 11 is a block diagram illustrating a local authorization server 1100 configured to support dynamic verification and enforcement of authorization agreements in accordance with aspects described herein. The local authorization server 1100 may be a proxy for an authorization server (e.g., 1000, FIG. 10). In one example, the local authorization server 1100 may include a network communication circuit 1102, a processing circuit 1104, and a memory circuit/storage device (referred to herein as memory circuit 1106). The network communication circuit 1102, processing circuit 1104, and memory circuit 1106 may be coupled to a communication bus 1108 for exchange of data and instructions.

The network communication circuit 1102 may be configured to include an input/output module/circuit/function 1110 for communication with network nodes such as an authorization server and/or a network access node. Other circuits/functions/modules may be included in the network communication circuit 1102 of the local authorization server 1100 as will be appreciated by those of skill in the art.

The processing circuit 1104 may be configured to include or implement one or more processors, application specific processors, hardware and/or software modules, etc., that are configured to support dynamic verification and enforcement of authorization agreements. The processing circuit 1104 may include an authorization agreement management circuit/function/module 1112, which may manage the collection, maintenance, and organization of authorization agreements stored in the local authorization server 1100. The processing circuit 1104 may include a feature activation key derivation circuit/function/module 1114, which may be used to derive feature activation keys that may be used to activate selectively activated features of devices. The processing circuit 1104 may include an authorization parameter derivation circuit/function/module 1116, which may be used to derive authorization parameters (e.g., expiration date of an authorized selectively activated feature) that may be passed to devices along with feature activation keys. The processing circuit 1104 may include an authorization certificate derivation circuit/function/module 1118 which may derive an authorization certificate based, for example on data in an authorization agreement, and encrypt the authorization certificate with a public key of a device. The processing circuit 1104 may include a feature usage reporting circuit/function/module 1138, which may collect feature usage data from devices coupled to the local authorization server 1100. Other circuits/functions/modules may be included in the processing circuit 1104 of the local authorization server 1100 as will be appreciated by those of skill in the art.

The memory circuit 1106 may be configured to include authorization agreement management instructions 1120, feature activation key derivation instructions 1122, authorization parameter derivation instructions 1124, authorization certificate derivation instructions 1126, as well as space for feature activation key storage 1130, authorization parameter storage 1132, authorization certificate storage 1134, and public key storage 1136. The memory circuit 1106 may also be configured to include feature usage reporting instructions 1140. Other instructions and locations for storage of data may be included in the memory circuit 1106 as will be appreciated by those of skill in the art.

Exemplary Call Flow Diagram of Feature Activation

Figure 12:
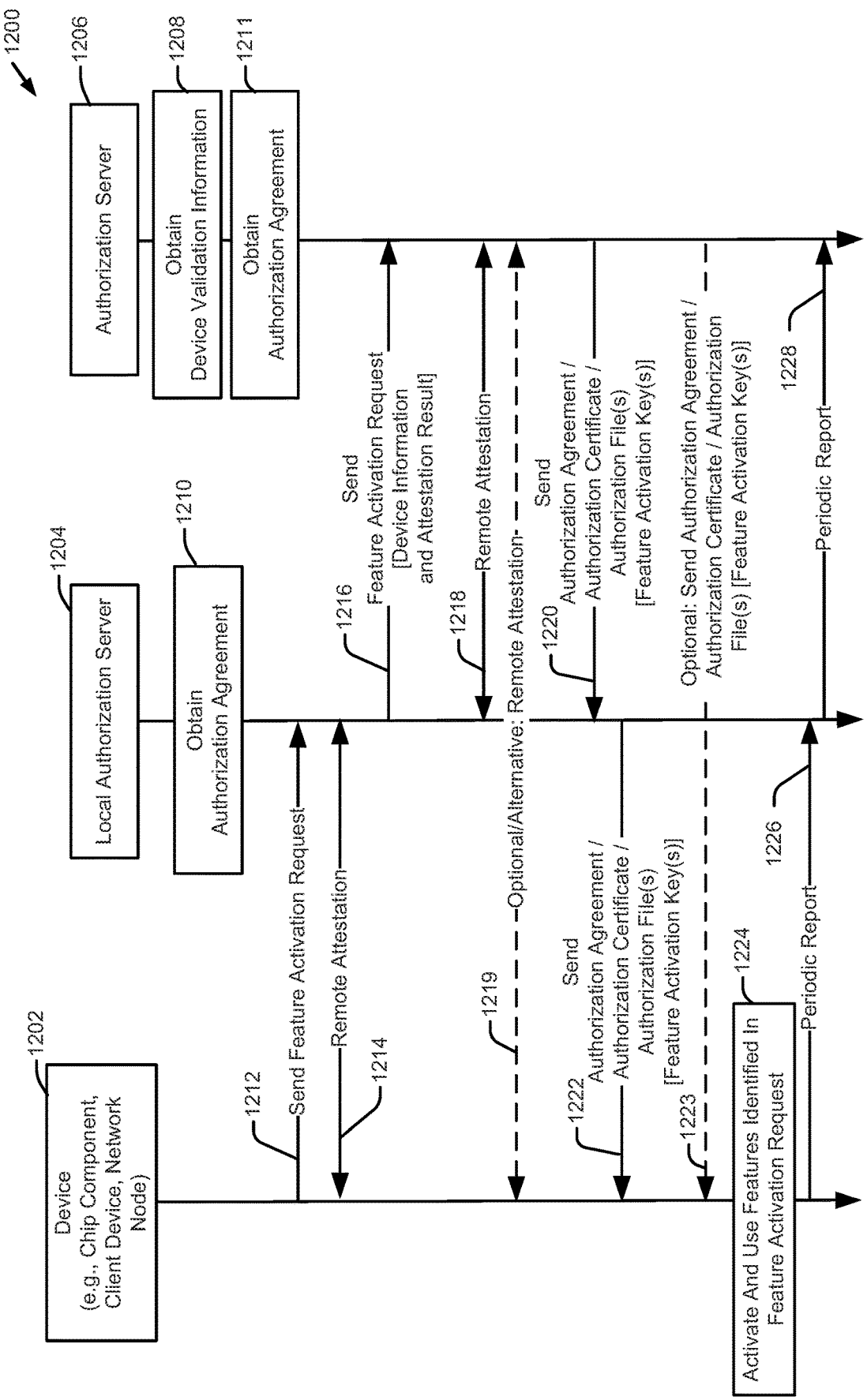
FIG. 12 is a call flow diagram related to dynamic verification and enforcement of authorization agreements in accordance with aspects described herein.

FIG. 12 is a call flow diagram 1200 related to dynamic verification and enforcement of authorization agreements in accordance with aspects described herein. FIG. 12 depicts exemplary interactions between a device 1202 (e.g., chip component, client device, network node), a local authorization server 1204, and an authorization server 1206. In an aspect, call flow to and from the device 1202 may be to and from an authorization function of the device 1202.

An authorization server 1206 may obtain device validation information 1208 from a vendor/OEM or another entity. The device validation information may include, for example, a device identifier, a device certificate, a device public key, software version (e.g., software version of software associated with the authorization function residing on the device 1202), and/or device capabilities. Device capabilities may include a listing of selectively activated features at the device 1202. It will be understood that obtaining device validation information at the authorization server 1206 may be an ongoing process. There is no limitation as to when device validation information may be added, modified, or removed from the authorization server 1206.

An authorization agreement may be entered into between two entities. The authorization agreement (or a copy thereof) may be obtained 1210 at the local authorization server 1204 for storage, may be obtained 1211 at the authorization server 1206 for storage, or may be obtained at both the local authorization server 1204 and the authorization server 1206 for storage. In one example, the authorization agreement may include a provision calling for the validation of software running at the local authorization server.

A device 1202 (or an authorization function of the device 1202) may send a feature activation request 1212 (e.g., a request to activate one or more selectively activated features) to the local authorization server 1204. The feature activation request may include a certificate signing request for certificate based verification.

The device 1202 and local authorization server 1204 may engage in remote attestation 1214. Remote attestation 1214 may be used by a first entity to verify that a second entity is working correctly (e.g., based on a known correct state). For example, the local authorization server 1204 may verify that the device 1202 is working correctly by validating the software running at the device 1202. In one example, validating the software may entail comparing the software identified in device validation information sent to the local authorization server 1204 matches the software running at the device 1202. The result of remote attestation 1214 may be sent to the authorization server 1206. The result of remote attestation 1214 may be used to assure the authorization server 1206 that an attacker has not compromised the device 1202 and that the device 1202 is running software described/identified by the vendor/OEM. If remote attestation is not successful, the feature activation request may be ignored.

If remote attestation 1214 is successful, based on the authorization agreement (e.g., the authorization agreement obtained at the local authorization server for storage), the local authorization server 1204 may determine whether to request feature activation for the device to the authorization server 1206 (e.g., send feature activation request 1216) or authorize feature activation for the device on its own authority (e.g., send authorization agreement/authorization certificate/authorization file(s) 1222). The latter scenario may occur, for example, when the local authorization server 1204 has obtained one or more authorization keys feature activation keys) from the authorization server 1206 in advance, based on the authorization agreement.

If the local authorization server 1204 determines to request feature activation for the device to the authorization server 1206, the local authorization server 1204 may send (e.g., forward) the feature activation request 1216 to the authorization server 1206, in which case, the local authorization server 1204 may be a proxy server that provides a secure tunnel between the device 1202 and the authorization server 1206. The feature activation request may include device validation information (e.g., a device identifier, a device certificate, a device public key, software version, and/or device capabilities) and remote attestation 1214 results. The feature activation request 1216 sent to the authorization server 1206 may also include the certificate signing request, if the certificate signing request was included with the feature activation request sent to the local authorization server from the device.

In one aspect, the local authorization server 1204 and authorization server 1206 may engage in remote attestation 1218. For example, the local authorization server 1204 may send proof to the authorization server 1206 that the local authorization server 1204 is running the correct software. In this way, the authorization server 1206 may be able to trust the information about the device 1202 sent to the authorization server 1206 by the local authorization server 1204. In accordance with such an aspect, the authorization server 1206 may accept a result of the remote attestation performed between the device 1202 and the local authorization server 1204. Optionally or alternatively, the authorization server 1206 and the device 1202 may engage in remote attestation 1219.

Once the authorization server 1206 accepts the results of the remote attestation (with either or both of the local authorization server 1204 and the device 1202) (e.g., verification is successful) and the authorization server 1206 can verify that the feature activation request complies with the terms of the authorization agreement, the authorization server 1206 may send 1220 the authorization agreement, authorization certificate, or authorization agreement and authorization certificate (e.g., proof of authority) of the device 1202 to use a set of selectively activated features at the device 1202 and the authorization file including feature activation key(s), to the local authorization server 1204. In one aspect, the authorization server 1206 may verify an authorization agreement of the device 1202 with a network operator (e.g., an MNO) (or a third entity). The proof of authority sent by the authorization server 1206 may include an authorization agreement, an authorization certificate, or both the authorization agreement and the authorization certificate. Optionally, the authorization server 1206 may send 1223 the authorization agreement/authorization certificate/authorization file(s) including feature activation keys directly to the device 1202.

If the local authorization server 1204 determined to send a feature activation request to the authorization server 1206 (e.g., request feature activation for the device to the authorization server 1206) and obtained the proof of authority for the device to use a set of selectively activated features at the device and the authorization file including feature activation key(s) from the authorization server 1206, or determined to send the proof of authority for the device and the authorization file on its awn authority (e.g., in the case where the local authorization server 1204 obtained one or more authorization keys from the authorization server 1206 in advance, based on the authorization agreement), the local authorization server may send the authorization agreement/authorization certificate/authorization file(s) 1222 to the device 1202. That is, local authorization server 1204 may send the proof of authority for the device to use the set of selectively activated features and the authorization file including feature activation key(s) (and software, if available) to the device 1202.

Once the device 1202 obtains the proof of authority for the device to use the set of selectively activated features at the device (e.g., the authorization agreement, the authorization certificate, or both the authorization agreement and the authorization certificate), and the authorization file including feature activation key(s) (e.g., in response to a feature activation request), the device 1202 (and/or authorization function of the device) may validate the proof of authority (e.g. to determine whether the device is authorized to activate and use the requested selectively activated feature(s)). If the device (and/or authorization function of the device) determines that the device is authorized to use the requested selectively activated feature(s), the device (and/or authorization function of the device) may retrieve the feature activation key(s) for the requested selectively activated features and activate the requested selectively activated feature(s) 1224. In some implementations, the requested selectively activated feature(s) may remain activated until an expiration time specified in the proof of authority (e.g., in the authorization certificate) or an expiration time specified in the authorization file.

The device 1202 may send a periodic report 1226 to the local authorization server 1204 regarding usage of the selectively activated features. The local authorization server 1204 may aggregate reports received from a plurality of devices and may send a periodic report 1228 to the authorization server 1206 regarding usage of the selectively activated features. Those of skill in the art will appreciate that various systems may use various types of usage reporting formats. The aspects described herein are not limited to any one usage reporting format.

Periodic reports may give flexibility to the local authorization management by allowing an operator to activate a selectively activated feature at a plurality of devices (e.g., chip components, client devices, network nodes) as long as the total number of activated selectively activated features satisfies the terms of a pertinent authorization agreement. For example, the periodic reporting may allow an operator to activate a maximum allowable number of selectively activated features concurrently.

Exemplary System Level Call Flow Diagrams of Validation of Authorization for Use Before using a network service, each side (e.g., client side and serving side; client device and network node) may validate that the other side is authorized to activate and use one or more selectively activated features needed to use the network service, and/or needed to provide the network service. In other words, an act of mutual feature verification may occur. In this way, each side may enforce the terms of authorization agreements that may govern the rights of the devices (e.g., chip components, client devices, network nodes) to use/provide the one or more selectively activated features. Accordingly, before using/providing a network service, each side may obtain proof of authority of the other side's right to use selectively activated features needed to provide/use the network service, and may validate that proof of authority.

Two exemplary system level methods to validate the proof of authority for a device (e.g., chip component, client device, network node) to use a set of selectively activated features are provided below. The first method provides for validation based on a subscription profile of a device. The second method provides for validation based on authorization information sent by the device. The exemplary system level methods are not exclusive.

Prior to implementation of either exemplary system level method, authorization information on a per device (e.g., chip component, client device, network node) basis may be stored by the device. Additionally, the authorization information, or information reflecting new and/or updated selectively activated features of the device, may also be stored on a home subscriber server (HSS). For example, when a device activates a selectively activated feature, an authorization server or a local authorization server may report the activation of the selectively activated feature to the HSS. The HSS can update a capability profile of the device when the authorized new and/or updated selectively activated features of the device are verified by a network operator, (e.g., an MNO). The capability profile of the device can be associated with a subscription profile of the device. The capability profile may identify selectively activated features that the device is authorized to use. In one example, the capability profile of the device, stored at the HSS, may be available to the device, to a network node, or to the device and the network node.

Additionally, according to an aspect, a network node (e.g., eNB) may announce, to devices (e.g., chip components, client devices), the set of selectively activated features activated (e.g., enabled, used) at the network node. A set of features can be announced, for example, using System Information Block (SIB) messages or via a querying protocol such as a Service Query Protocol (SQP).

Figure 13:
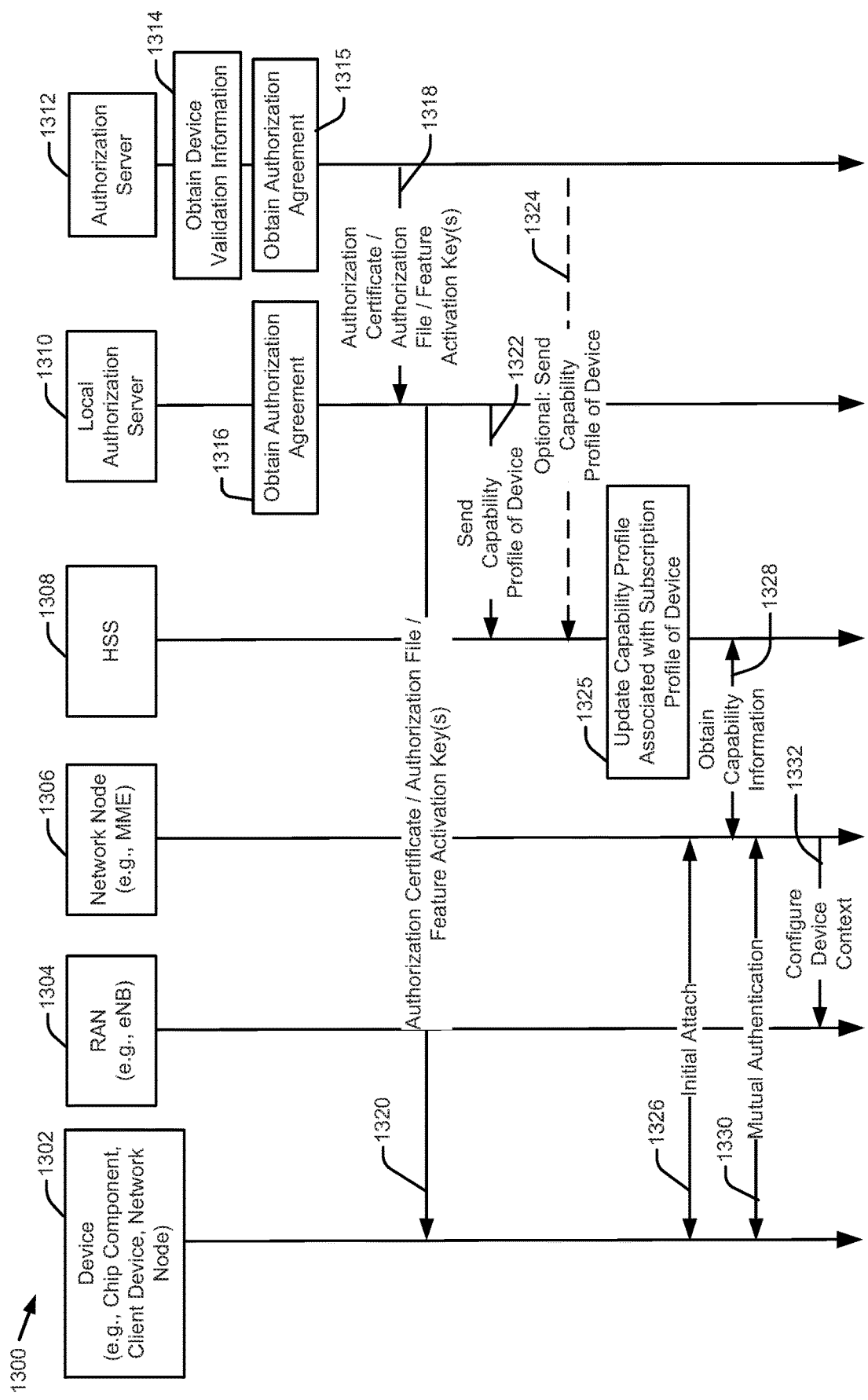
FIG. 13 is an exemplary call flow diagram illustrating a system level call flow that may take place in connection with validating proof of authority for a device to use a first set of selectively activated features, based on a subscription profile of the device, in accordance with aspects described herein.

FIG. 13 is an exemplary call flow diagram 1300 illustrating a system level call flow that may take place in connection with validating proof of authority for a device (e.g., chip component, client device, network node) to use a first set of selectively activated features, based on a subscription profile of the device, in accordance with aspects described herein. Illustrated are a device 1302 (e.g., chip component, client device, network node), a radio access network (RAN) 1304 (which includes, for example, one or more eNBs and/or access points), a network node 1306 (e.g., an MME), an HSS 1308, a local authorization server 1310, and an authorization server 1312.

In some implementations, the authorization server 1312 may obtain device validation information 1314 from a vendor/OEM or another entity. The device validation information may include, for example, a device identifier, a device certificate, a device public key, software version (e.g., software version of software associated with the authorization function residing on the device 1302), and/or device capabilities. Device capabilities may include a listing of selectively activated features at the device 1302. It will be understood that obtaining device validation information at the authorization server 1312 may be an ongoing process. There is no limitation as to when device validation information may be added, modified, or removed from the authorization server 1312.

An authorization agreement may be entered into between two entities. The authorization agreement may be obtained 1315 at the authorization server 1312 for storage, the authorization agreement may be obtained 1316 at the local authorization server 1310 for storage, or the authorization agreement may be obtained at both the local authorization server 1310 and the authorization server 1312 for storage. In one example, the authorization agreement may include a provision calling for the validation of software running at the local authorization server.

During feature activation, the authorization server 1312 may derive authorization certificates, authorization files, and feature activation keys, all as described above. Also during feature activation, the authorization server 1312 may send 1318 proof of authority for the device to use a set of selectively activated features at the device (e.g., authorization information in the form of an authorization agreement, an authorization certificate, or an authorization agreement and an authorization certificate) and an authorization file that may include feature activation key(s) to the local authorization server 1310, all as described above. Alternatively, but not shown in the figure to avoid overcrowding in the drawing, the authorization server 1312 may send the proof of authority to the device 1302, all as described above. Additionally, or alternatively, during feature activation, the local authorization server 1310 may send 1320 the proof of authority for the device to use the set of selectively activated features at the device (e.g., authorization information in the form of an authorization agreement, an authorization certificate, or an authorization agreement and an authorization certificate) and the authorization file that may include feature activation key(s) to the device 1302, all as described above. In one aspect, the local authorization server 1310 may send a capability profile 1322 of the device 1302 to the HSS 1308. The capability profile of the device 1302 may list the selectively activated features authorized to be activated at the device 1302. The capability profile may list the parameters associated with the selectively activated features. The capability profile of the device may be used to update to a corresponding capability profile of the device 1302 that can be stored at the HSS 1308. In one aspect, the authorization server 1312 may send the capability profile 1324 of the device 1302 to the HSS 1308.

With reference to the HSS 1308, the capability profile of the device 1302 may include the list the selectively activated features authorized to be activated at the device 1302 and may be associated with the subscription profile of the device 1302. The capability profile of the device 1302, obtained by the HSS 1308, enables the HSS 1308 to learn the authorization status of new and/or updated selectively activated features of the device 1302. In an aspect, the HSS 1308 may consult with a network operator (e.g., an MNO) to determine if the HSS 1308 should update the corresponding capability profile of the device 1302 stored at the HSS 1308. In an aspect, with or without consent of the network operator, the HSS 1308 may update 1325 the capability profile of the device 1302 stored at the HSS 1308. Accordingly, the HSS 1308 may update 1325 a list of selectively activated features of the device 1302 based on the list the selectively activated features authorized to be activated at the device obtained from the local authorization server 1310 or the authorization server 1312. Updating the list may reflect a change to an authorization status of at least one selectively activated feature in the set of selectively activated features authorized to be activated at the device 1302.

Upon device 1302 initial attach procedure 1326, the network node 1306 (e.g., MME) may obtain 1328 the capability profile of the device 1302 from the HSS 1308. In one aspect, the network node 1306 (e.g., MME) may obtain 1328 the capability profile of the device 1302 from the HSS 1308 by sending a request to the HSS 1308.

In one example, the capability profile may include integrity information (e.g., software integrity information of the authorization function of the device 1302) obtained during a secure/authenticated boot process of the device 1302. By way of example, in a case where an integrity profile is obtained during the secure/authenticated boot process (e.g., during an authentication and key agreement (AKA) procedure), the network node 1306 (e.g., MME) may request the device 1302 to send the integrity information that proves the integrity of the software running in the device 1302. Integrity information of a device 1302 may be sent by the device 1302 as proof that the device 1302 is running a legitimate software (i.e., the device is running authorized software). In one aspect, the network node 1306 (e.g., MME) may make a request for integrity information during mutual authentication 1330 (e.g., remote attestation) with the device 1302. The integrity information may be used during mutual authentication 1330. It is noted that the preceding is exemplary; a request to send integrity information may occur during the AKA procedure or as a separate procedure.

The network node 1306 (e.g., MME) may configure a device context 1332 (e.g., a UE context that may identify a specific signal radio bearer or default radio bearer or data flow) based on the capability profile of the device 1302 obtained from the HSS 1308. The network node 1306 (e.g., MME) may configure the device context 1332 with the RAN 1304 (e.g., eNBs of the RAN) and may send the device context and/or the capability profile to the RAN 1304. This can allow the RAN 1304 to activate/de-activate selectively activated features, thereby enabling disabling) a network service provided to the device 1302. Enablement/disablement of a network service for the device 1302 may be achieved by updating/setting the device context according to the capability profile of the device 1302. Non-access stratum (NAS) and radio resource control (RRC) procedures may be used for this purpose.

It may be noted that during an S1 handover, the device context (e.g., UE context) may be transferred to a target MME if MME relocation is performed. During X2 handover, the source network access node (e.g., source eNB) may send the device context (e.g., UE context) that specifies device capability to a target network access node (e.g., target eNB).

If the capability profile of the device 1302 indicates that certain selectively activated features need to be de-activated (e.g., due to expiry), the network node 1306 (e.g., MME) may deactivate the selectively activated features and may apply the corresponding configuration to the network access node (e.g., eNB) (within the RAN 1304). The corresponding configuration may be applied to the network access node using, for example, a device context modification procedure (e.g., a UE context modification procedure). The device 1302 may reactivate any de-activated selectively activated feature by renewing the authorization agreement (stored in the authorization server) and then performing feature activation (e.g., sending a feature activation request) as described above.

The first exemplary system level method may make use of the authorization information stored in the capability profile of the device 1302, associated with the subscription profile of the device 1302, at the HSS 1308. The HSS 1308 may implement an element of information (similar to an information element in Access Network Query Protocol (ANQP)) that may be used in a query-response type protocol to identify one or more selectively activated features that are activated, or authorized to be activated, at the device 1302. The element of information may be used to facilitate responses to queries concerning what features (e.g., what selectively activated features) are available on the device 1302 (e.g., client device, network access node, etc.). The element of information may be thought of as a parameter associated with an enhanced ANQP protocol, which may be referred to herein as a service query protocol (SQP).

By way of example, a device 1302 (e.g., a client device) may have a subscription permitting the device 1302 to use the Internet, but not voice-over IP. Subscription information may be stored in a subscription profile of the device 1302 at the HSS 1308. A capability profile of the device may also be stored at the HSS 1308. The capability profile may be associated with the subscription profile. Elements of information relating to the subscription information and capability profile may be sent to the network node 1306 (e.g., MME) during an initial attach procedure 1326. It is noted that the initial attach procedure 1326 may occur infrequently.

In the example, the network node 1306 (e.g., MME) receiving the described element of information may configure the network such that the device 1302 can use the Internet (e.g., as a first data service), but not voice over IP (e.g., as a second data service). The first exemplary method, which can make use of the authorization information stored in the capability profile of the device 1302, associated with the subscription profile of the device 1302, may therefore make use of a capability profile element. The capability profile element can be used to validate and enforce an authorization of the device 1302 to use one or more selectively activated features that are needed to enable the network service. The authorization may ultimately be based on the authorization agreement obtained at the authorization server 1312 (or in some aspects, the authorization agreement obtained at the local authorization server 1310).

The information from the capability profile of the device 1302 stored at the HSS 1308 may be used by a network node 1306 (e.g., MME) to configure various network functions. The various network functions can enable the device 1302 to make use of the one or more selectively activated features that may be activated (or may be authorized to be activated) at the device 1302.

Figure 14:
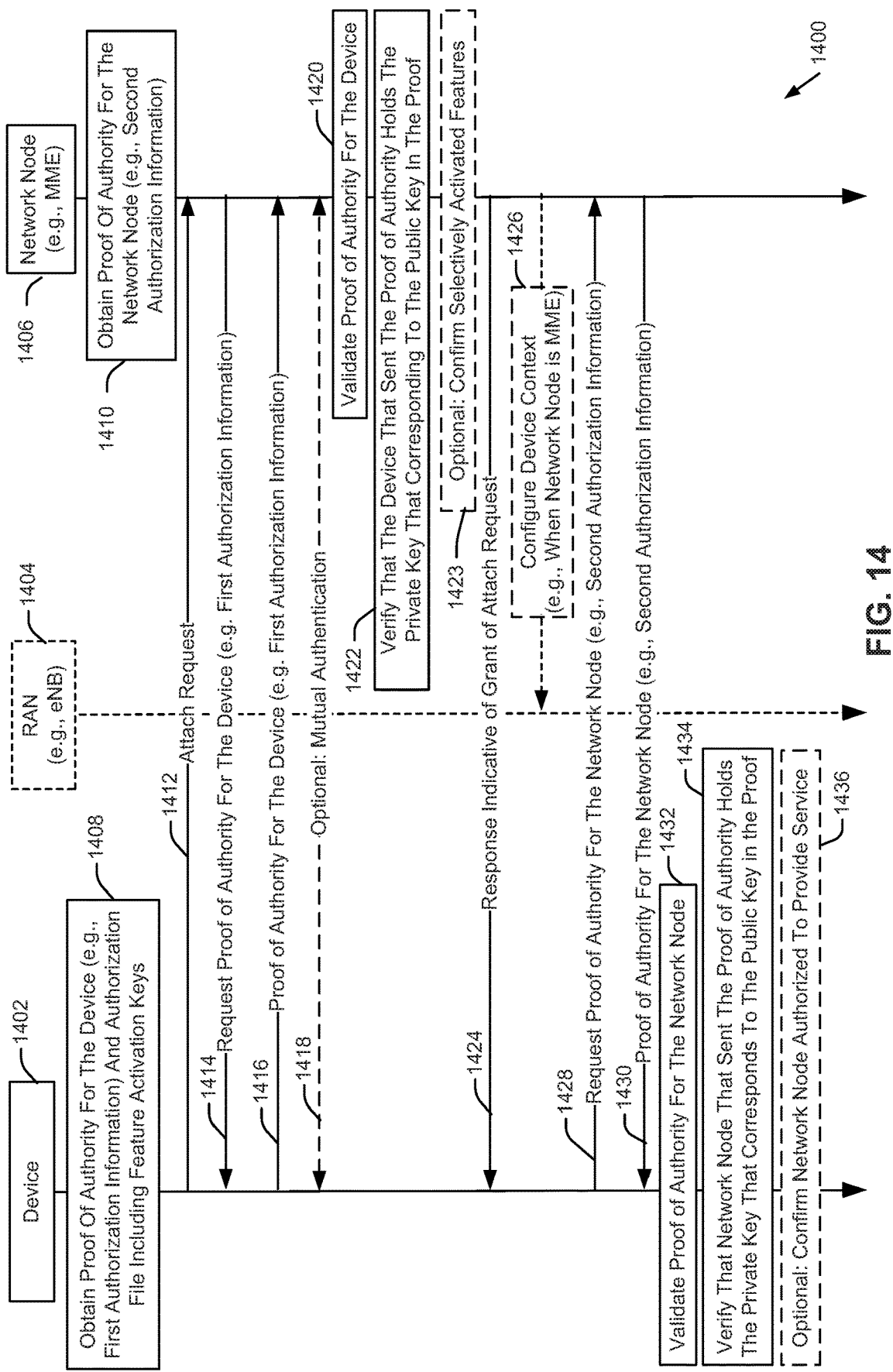
FIG. 14 is an exemplary call flow diagram illustrating another system level call flow that may be associated with validating proof of authority for a device to use a first set of selectively activated features identified in an authorization certificate stored at the device in accordance with aspects described herein.

FIG. 14 is an exemplary call flow diagram 1400 illustrating another system level call flow that may be associated with validating proof of authority for a device 1402 (e.g., chip component, client device, network node) to use a first set of selectively activated features identified in an authorization certificate stored at the device 1402 in accordance with aspects described herein. Illustrated are a device 1402 (e.g., chip component, client device, network node), a radio access network (RAN) 1404 (e.g., one or more eNBs and/or access points), and a network node 1406 (exemplified in FIG. 14 as an MME). The exchanges described below, which occur between the network node 1406 exemplified as an MME and the device 1402 may be performed between any device 1402 and network node (e.g., network access node, eNB, MME, S-GW, P-GW). It is noted that while an operation of configuring the device context 1426 may be applicable for a network node 1406 such as an MME, the operation of configuring the device context 1426 may not be applicable for other examples of network nodes such as an eNB. Accordingly, the operation of configuring the device context 1426 and the RAN 1404 (which can be the recipient of the operation of configuring the device context 1426) are depicted in broken line form because they are applicable for the example of FIG. 14, where the network node 1406 is exemplified as an MME, but may not be applicable for other examples (e.g., where the network node 1406 is a node other than an MME).

As described above, during feature activation for example, the device 1402 (e.g., client device) may obtain proof of authority for the device 1402 to use a first set of selectively activated features at the device 1402 (e.g. first authorization information, which may be in the form of an authorization certificate, signed by a first authorization server) and an authorization file including feature activation keys 1408. The network node 1406 (e.g., MME) may use the first authorization information (e.g., an authorization certificate) to validate the authority of the device 1402 to use a network service. Similarly, the network node 1406 (e.g., MME) may obtain proof of authority for the network node 1406 to use a second set of selectively activated features at the network node 1406 (e.g. second authorization information, which may be in the form of an authorization certificate, signed by a second authorization server) 1410. The device 1402 (e.g., client device) may use the second authorization information (e.g., an authorization certificate) to validate the authority of the network node 1406 to provide a network service.

The first authorization information (e.g., an authorization certificate) may identify the selectively activated features authorized to the device 1402 and may be signed by the first authorization server using the private key of the first authorization server. The first authorization information (e.g., authorization certificate) may also include the identity of the device 1402 and may also include an expiration time of the authorization certificate. The authorization file may include feature activation keys and associated parameters and maybe encrypted with the public key of the device 1402. In some implementations, the device 1402 obtains the first authorization information (e.g., an authorization certificate) and the authorization file during feature activation.

The first authorization information (e.g., an authorization certificate) may be used with a corresponding identity certificate that includes, for example, a device identifier and a public key of the device 1402, signed by the first authorization server. The identity certificate may remain valid even upon the deactivation of one or more selectively activated features from the device 1402. In one aspect, the device identifier may be, for example, a device serial number or an International Mobile Station Equipment Identity (IMEI). In implementations herein, the device identifier may always be associated with the device public key so that the device 1402 can prove its ownership of the device identifier.

In one aspect, the public key of the device 1402 (or a hash of the public key) used as a device identifier. In this case, the identity certificate can be unnecessary, yet the identity of the device 1402 should be able to be verified through the first authorization server and/or local authorization server and/or a third entity.

The first authorization information (e.g., an authorization certificate) may be obtained by the device 1402 from a local authorization server. In this case, the device 1402 may obtain a certificate of the local authorization server, for example, during the feature activation.

The device 1402 may send an attach request 1412 to the network node 1406. In an aspect, the attach request may be understood to be, or to include, a request to use a network service. In response, the network node 1406 (e.g., MME) may send a request 1414, to the device 1402, for proof of authority for the device 1402 to use the first set of selectively activated features at the device 1402, where the first set of selectively activated features includes first selectively activated features needed by the device 1402 to use the network service. In other words, the network node 1406 (e.g., MME) may send a request 1414, to the device 1402, for the proof of authority for the device (e.g., the first authorization information, which may be in the form of an authorization certificate). In an aspect, such a request 1414 may be sent during an authentication and key agreement (AKA) procedure. The device 1402 may send 1416, to the network node 1406, in response to the request 1414, the proof of authority for the device 1402.

Mutual authentication 1418 may occur between the device 1402 and the network node 1406. The mutual authentication 1418 can be optional. Mutual authentication 1418 may be implemented to provide assurance that the device 1402 and network node 1406 are communicating with a correct entity by establishing a secure channel. It is noted that mutual authentication 1418 remote attestation) with the device 1402 is different from an AKA procedure that is used for the device 1402 to register to a network.

It is additionally noted that, in some examples, mutual authentication 1418 may be implemented before the network node 1406 sends the request 1414, to the device 1402, for proof of authority for the device 1402. For example, if the network node 1406 is an MME (as exemplified in FIG. 14), once the AKA procedure is completed, the device 1402 and the MME can communicate with each other over a secure transport (i.e., NAS messages). Consequently, the device 1402 and MME may authenticate each other.

In one aspect, the network node 1406 (e.g., MME) may request the device 1402 to send integrity information (e.g., software integrity information of the authorization function of the device 1402) created during a secure/authenticated boot process of the device 1402. By way of example, in a case where integrity information is obtained during the secure/authenticated boot process, the integrity information may be used to prove the integrity of the software running in the device 1402. In one aspect, the network node 1406 (e.g., MME) may make a request for integrity information during mutual authentication 1418 (e.g., remote attestation) with the device 1402. The integrity information may be used during mutual authentication.

The network node 1406 (e.g., MME) may validate 1420 the proof of authority for the device 1402 to use the first set of selectively activated features at the device (e.g., the first authorization information). Validation may be performed by validating the proof of authority for the device 1402. (e.g., the first authorization information) using the authorization server public key (or using the public key of the local authorization server if the local authorization server created the proof of authority for the device 1402). In addition, in an aspect, the network node 1406 may verify 1422 that the device 1402 that sent the proof of authority for the device 1402 the first authorization information) holds the private key that corresponds to the public key of the device 1402 included with the proof of authority for the device 1402 (e.g., the first authorization information). Verification may be performed, for example, by validating a signature of the device 1402 that may be sent with the proof of authority for the device 1402 the first authorization information) using the public key of the device 1402 included with the proof of authority for the device 1402 (e.g., the first authorization information).

If, as in the exemplary illustration of FIG. 14, the network node is an MME, then, if both the validation 1420 and verification 1422 are successful, the network node 1406 (e.g., MME) may implement an operation of configuring the device context 1426 to implement the use of the network service at the RAN 1404. In one example, the network node 1406 may configure the RAN 1404 such that the device 1402 can use the authorized selectively activated features, if the network node is, for example, an MME. In another example, the network node 1406 may configure the RAN 1404 such that the device 1402 can only use the authorized selectively activated features, if the network node is, for example, an MME.

However, as noted above, if the network node was an eNB, then the operation of configuring the device context 1426 may not be applicable. Accordingly, the operation of configuring the device context 1426 and the RAN 1404 are depicted in broken line form.

According to some aspects, if both the validation 1420 and verification 1422 are successful, then the network node 1406 may verify that the selectively activated features needed to be used by the device 1402 to obtain the network service match the selectively activated features activated at the device 1402 according to the first authorization information. In other words, an optional operation of confirming activation of needed selectively activated features 1423 may take place. In an aspect, confirming activation of needed selectively activated features 1423 may involve identifying a needed set of selectively activated features needed by the device 1402 to use the network service, and sending a response 1424 to the request based on determining whether the needed set of selectively activated features is included in a first set of selectively activated features, where the first set of selectively activated features is a set of selectively activated features identified in the proof of authority for the device (e.g., the first authorization information).

In an aspect, identifying the needed set of selectively activated features may include deriving selectively activated features needed by the device 1402 to use the network service from a model-specific and/or a device-specific list of authorized selectively activated features maintained by the first authorization server. In another aspect, identifying the needed set of selectively activated features may include deriving selectively activated features needed by the device 1402 to use the network service from a model-specific and/or a device-specific list of licensable selectively activated features maintained by the first authorization server.

In an aspect, the network node 1406 may send a response 1424 indicative of a grant of the attach request.

The aspects described herein permit the network node 1406 to validate the right of the device 1402 to use a network service; however, they also permit the device 1402 to validate the right of a network node 1406 to provide the network service. Some networks nodes may falsely advertise the availability of features (e.g., selectively activated features) to a device 1402. In actuality, a certain feature may not be activated even though the network node advertises to the contrary. If the network does not provide the advertised feature or service to the device 1402, the network may charge the device 1402 more by using, for example, an inferior service. Therefore, the device 1402 has an interest in verifying that a network node that advertises a feature is authorized to provide that feature. Once the device 1402 verifies that the network is authorized to provide the feature, and thereby confirms that the feature is available at the network, the device 1402 can couple to the network and use the network service.

Accordingly, the device 1402 may send 1428 a request for proof of authority for the network node to provide the network service. In response, the network node 1406 may send 1430 proof of authority for the network node to use a second set of selectively activated features at the network node (e.g., second authorization information), signed by a second authorization server, where the second set of selectively activated features includes second selectively activated features needed by the network node to provide the network service. The device 1402 may validate 1432 the second authorization information (e.g., a second authorization certificate) sent to the device 1402 by the network node 1406. Validation may be performed using the second authorization server public key (or using the public key of a second local authorization server if the second local authorization server created the proof of authority for the network node 1406).

In addition, in an aspect, the device 1402 may verify 1434 that the network node 1406 that sent the proof of authority for the network node 1406 (e.g., the second authorization information) holds the private key that corresponds to the public key of the network node 1406 included with the proof of authority for the network node 1406 (e.g., the second authorization information). Verification may be performed, for example, by validating a signature of the network node 1406 that may be sent with the proof of authority for the network node 1406 (e.g., the second authorization information) using the public key of the network node 1406 included with the proof of authority for the network node 1406 (e.g., the second authorization information).

According to some aspects, if both the validation 1432 and verification 1434 are successful, then the device 1402 may verify that the selectively activated features needed to be used by the network node 1406 to provide the network service match the selectively activated features activated at the network node 1406 according to the second authorization information. In other words, an optional operation of confirming that the network node is authorized to provide the network service 1436 may take place. In an aspect, confirming that the network node is authorized to provide the network service 1436 may involve identifying a third set of selectively activated features needed by the network node 1406 to use the network service, and using the network service based on determining whether the third set of selectively activated features is included in a second set of selectively activated features, where the second set of selectively activated features are identified in the proof of authority for the network node 1406 (e.g., the second authorization information). In an aspect, if validation 1432, verification 1434, and confirming that the network node is authorized to provide the network service 1436 are successful, the device 1402 may use the network service offered by the network node 1406.

Exemplary Device

FIG. 15 is a block diagram illustrating an exemplary device 1500 (e.g., chip component, client device, a network node) configured to support dynamic verification and enforcement of authorization agreements, where enforcement includes dynamic validation of proof of authority for a device to use a set of selectively activated features and activation/deactivation of selectively activated features in accordance with the terms of the authorization agreements, in accordance with aspects described herein. In one example, the exemplary device 1500 may include a network communication circuit 1502, a processing circuit 1504, and a memory circuit/storage device (referred to herein as memory circuit 1506). The network communication circuit 1502, processing circuit 1504, and memory circuit 1506 may be coupled to a communication bus 1508 for exchange of data and instructions.

The network communication circuit 1502 may include a first input/output circuit/function/module 1510 for input/output operations with a user. The network communication circuit 1502 may include a second input/output circuit/function/module 1511 (e.g., a receiver/transmitter module/circuit/function) for wireless communication. Other circuits/functions/modules may be included with the network communication circuit 1502 as will be appreciated by those of skill in the art.

The processing circuit 1504 may be configured to include or implement one or more processors, application specific processors, hardware and/or software modules, etc., that are configured to support dynamic verification and enforcement of authorization agreements, where enforcement includes dynamic validation of proof of authority for a device to use a set of selectively activated features and activation/deactivation of selectively activated features in accordance with the terms of the authorization agreements. The processing circuit 1504 may be configured to include an authorization function circuit/function module 1512, an authorization certificate verification circuit/function module 1514, an authorization parameter evaluation circuit/function module 1516, and a feature activation key extraction circuit/function module 1518. Other circuits/functions/modules may be included with the processing circuit 1504 as will be appreciated by those of skill in the art.

The memory circuit 1506 may be configured to include authorization instructions 1520, authorization certificate verification instructions 1522, authorization parameter evaluation instructions 1524, and feature activation key extraction instructions 1526. A separate portion of the memory circuit 1506 may be configured to support secure storage. Accordingly, the memory circuit 1506 may further include a secure storage circuit 1528. The secure storage circuit 1528 may include private key storage 1530. The private key storage 1530 may store the private key of a public/private key pair, where an authorization server or local authorization server uses the public key of the public/private key pair to encrypt an authorization certificate. The secure storage circuit 1528 may further include feature activation key storage 1532. The memory circuit 1506 may further store a listing of selectively activated features 1534 as well as a listing of authorization parameters for each of the selectively activated features of the device 1536. Other instructions and locations for storage of data may be included in the memory circuit 1506 as will be appreciated by those of skill in the art.

Exemplary Methods of Verification/Enforcement of Authorization Agreements

FIG. 16 is a flowchart of an exemplary method 1600 operational at a device (e.g., chip component, client device, network node) in accordance with aspects described herein. In one aspect, the device may be similar to the exemplary device 1500 of FIG. 15 and/or device 302 of FIG. 3. Prior to implementing the exemplary method 1600, the device may have determined a set of one or more selectively activated features associated with use of a network service. Prior to implementing the exemplary method 1600, the device may have sent (to an authorization server or a local authorization server) a feature activation request (e.g., a request for authorization to activate the one or more selectively activated features). The feature activation request, or some other event, may act as a trigger event that can cause the authorization server (or local authorization server) to send the device proof of authority for the device to use a first set of selectively activated features at the device, signed by a first authorization server.

The device may obtain proof of authority for the device to use a first set of selectively activated features at the device, signed by a first authorization server 1602. The proof of authority for the device may be referred to herein as authorization information. The proof of authority for the device may include an authorization certificate. The proof of authority for the device may be obtained with an authorization file. The authorization file may include authorization parameters and one or more feature activation keys. As described herein, the device may have validated the authorization certificate, verified that the authorization server sending the proof of authority for the device was a correct (e.g., not an imposter) authorization server, decrypted the feature activation keys, and used the decrypted feature activation keys to active the first set of selectively activated features at the device.

The device may send a request to use a network service to a network node 1604. The first set of selectively activated features may include first selectively activated features needed by the device to use the network service. The first selectively activated features may be authorized to be activated at the device by the proof of authority obtained from the authorization server. According to some aspects, some or all of the first selectively activated features may be activated at the device on or before the time the device sends the request to use the network service.

The device may obtain, from the network node, in response to sending the request to use the network service, a request for the proof of authority for the device 1606. In response, the device may send, to the network node, the proof of authority for the device (e.g., the proof of authority for the device to use the first set of selectively activated features at the device, signed by the first authorization server) 1608.

The device may send, to the network node, a request for proof of authority for the network node to provide the network service 1610.

Optionally, the device may send device integrity information 1612. The device integrity information may have been obtained during a secure boot process. Still further optionally, the device may perform mutual authentication (e.g. remote attestation) between the device and a network node validating the request to use the network service 1614.

Optionally, the device may obtain a response granting the request to use the network service 1616. The response may be in response to sending the proof of authority for the device to use the first set of selectively activated features at the device, signed by the first authorization server.

The device may obtain, from the network node, proof of authority for the network node to use a second set of selectively activated features at the network node, signed by a second authorization server 1618. The second set of selectively activated features may include second selectively activated features needed by the network node to provide the network service.

The device may validate the proof of authority for the network node before using the network service 1620.

In some aspects, the proof of authority for the device may be obtained by the device from an authorization server (e.g., the proof of authority for the device originated at the authorization server). In some aspects, the proof of authority for the device may be obtained by the device from a local authorization server (e.g., the proof of authority for the device originated at the local authorization server). In some aspects, proof of authority for the device may include an authorization certificate. In some aspects, the proof of authority for the device may be obtained from an authorization server, or local authorization server, during a feature activation process (e.g., during activation of the selectively activated features needed to use the network service at the device).

According to some aspects, the device may be a chip component, a client device, a network access node, a mobility management entity, or a gateway device. According to an aspect, the device may be a client device or a chip component, and the network node may be a network access node. In one aspect, the proof of authority for the device originates at the first authorization server, is signed with a private key of the first authorization server, and includes a listing of the first selectively activated features. In such an aspect, the method may further include validating the proof of authority for the device by validating the listing of the first selectively activated features using a public key of the first authorization server. The method may still further include obtaining feature activation keys associated with the first selectively activated features, encrypted with a public key of the device.

The method may still further include decrypting the feature activation keys, using a private key of the device, known only to the device. The method may still further include activating and/or maintaining activation of the first selectively activated features with the feature activation keys.

According to one aspect, the proof of authority for the network node may originate at the second authorization server, is signed with a private key of the second authorization server, and includes a listing of the second selectively activated features. In such an aspect, the method may also include validating the proof of authority for the network node by validating the listing of the second selectively activated features using a public key of the second authorization server.

According to some aspects, the first authorization server may be a local authorization server.

In one aspect, the method may also include identifying a third set of selectively activated features needed by the network node to use the network service, and using the network service based on determining whether the third set of selectively activated features is included in the second set of selectively activated features.

In still another aspect, the proof of authority for the device may originate at the first authorization server and is obtained, at the device, from the first authorization server, while the proof of authority for the network node originates at the second authorization server and is obtained, at the device, from the network node.

In some aspects, the first authorization server and the second authorization server are one authorization server.

In one aspect, the proof of authority for the device may be obtained from the first authorization server during a feature activation process, during which the device obtains authorization to activate the first selectively activated features.

In one example, the proof of authority for the network node is obtained from the network node during an authentication and key agreement (AKA) process.

In one aspect, the proof of authority for the device can be data representative of an authorization certificate. In one aspect, the proof of authority for the device can be data representative of an authorization agreement indicating that the device is authorized to activate the first selectively activated features.

According to one aspect, the first authorization information may include, for each of the selectively activated features authorized to be activated at the device, a date upon which authorization to activate the selectively activated feature will expire.

FIG. 17 is a flowchart of an exemplary method 1700 operational at a device (e.g., ship component, client device, network node) in accordance with aspects described herein. In one aspect, the device may be similar to the exemplary device 1500 of FIG. 15. The device may obtain information identifying capability of a network access node to provide a network service 1702. The information may be received in any suitable manner. For example, the information may be received in the form of an advertisement from the network access node (e.g., eNB). The advertisement may advertise network capability via an over-the-air broadcast (e.g., advertise via information presented in a system information block (SIB)). As another example, the information may be received in a response to an access network query protocol (ANQP) or a service query protocol (SQP) query. The network capability may include, for example, a network service offered by the network access node.

The device may obtain, from the network access node, authorization information to verify authority of the network access node to offer the network service 1704. In one aspect, the authorization information may be in the form of an authorization certificate. An authorization server (or local authorization serve may have sent the authorization certificate to the network access node. The device may obtain the authorization information by, for example, sending a request to the network access node to send authorization information to verify that the network access node is authorized to provide the network service.

The device may validate the authorization information 1706 to validate the network access node and/or the authority of the network access node to provide the network service. In some aspects, the authorization information may be validated by validating the authorization certificate. In some aspects, if an authorization server issued the authorization certificate, the authorization certificate may be validated using a public key of the authorization server. In some aspects, if a local authorization server issued the authorization certificate, the authorization certificate may be validated using a public key of the local authorization server. The device may determine if validation of the authorization information was successful 1708. If the device determines that the validation of the authorization information was successful, the device may use 1710 the network service. If the device determines that the validation of the authorization information was not successful, the device may not use 1712 the network service.

FIG. 18 is a flowchart of an exemplary method 1800 operational at a network node (e.g., network access node, eNB, MME, S-GW, P-GW) in accordance with aspects described herein. In one aspect, the network node may be similar to the exemplary device 1500 of FIG. 15. The network node can obtain a request, from a device, to use a network service 1802. The network node can also obtain, from the device, proof of authority for the device to use a first set of selectively activated features at the device, signed by an authorization server 1804.

The network node may validate the proof of authority for the device 1806. That is, the network node may validate the proof of authority for the device to use the first set of selectively activated features at the device, signed by the authorization server. The network node may validate the proof of authority for the device in order to validate the authority of the device to use the first set of selectively activated features at the device. The first set of selectively activated features may be needed by the device to use the network service. In some aspects, the proof of authority for the device may be validated by validating an authorization certificate. In some aspects, where an authorization server issued the authorization certificate, the authorization certificate may be validated using a public key of the authorization server. In some aspects, where a local authorization server issued the authorization certificate, the authorization certificate may be validated using a public key of the local authorization server.

The network node may independently identify features needed by the device to use the network service, and thereafter compare the first set of selectively activated features to the independently identified features needed by the device to use the network service. The network node may determine that the device is able to use the network service if the independently identified features match the first set of selectively activated features.

Accordingly, the network node may identify a second set of selectively activated features needed by the device to use the network service 1808. According to an aspect, the network node may identify the second set of selectively activated features by obtaining or deriving the features from a model-specific list of authorized selectively activated features maintained by an authorization server (or local authorization server) a device-specific list of authorized selectively activated features maintained by an authorization server (or local authorization server), or a model-specific and device-specific list of authorized selectively activated features maintained by an authorization server (or local authorization server). According to another aspect, the network node may identify the second set of selectively activated features by obtaining or deriving the features from a model-specific list of licensable selectively activated features maintained by an authorization server local authorization server), a device-specific list of licensable selectively activated features maintained by an authorization server (or local authorization server), or a model-specific and device-specific list of licensable selectively activated features maintained by an authorization server (or local authorization server).

The network node may send a response to the request based on results of validating the proof of authority for the device and determining whether the second set of selectively activated features is included in the first set of selectively activated features 1810. If the features independently identified by the network node (i.e., the second set of selectively activated features) are included in, or are a subset of, the first set of selectively activated features authorized to be activated at the device, and the proof of authority for the device to use the first set of selectively activated features at the device is successfully verified, the response to the request to use the network service may indicate that the device is permitted se the network service.

However, if the second set of selectively activated features is not included in the first set of selectively activated features or if the proof of authority for the device is not successfully validated, the network node may ignore the request to use the network service or may send a response to indicate that the device is not permitted to use the network service According to some aspects, the network node may be a network access node (e.g., an eNB), a mobility management entity, and/or a gateway device.

In an aspect, the first set of selectively activated features includes first selectively activated features, and the proof of authority for the device originates at the authorization server. The proof of authority for the device can include a listing of the first selectively activated features, signed with a private key of the authorization server. In an example, the method can further include validating the proof of authority for the device by validating the listing of the first selectively activated features using a public key of the authorization server.

In an aspect, the proof of authority for the device originates at the authorization server and can be obtained, at the network node, from the device. In another aspect, the proof of authority for the device originates at the authorization server and can be obtained, at the network node, in a form of a capability profile of the device, from a home subscriber server (HSS). In another aspect, the proof of authority for the device can be obtained from the device during an authentication and key agreement (AKA) process. In some aspects, the proof of authority for the device can be data representative of an authorization certificate. In still other aspects, the proof of authority for the device can be data representative of an authorization agreement indicating that the device is authorized to activate the first set of selectively activated features.

In one example, identifying the second set of selectively activated features can include the network node deriving selectively activated features needed by the device to use the network service from a model-specific and/or a device-specific list of authorized selectively activated features maintained by the authorization server. In another example, identifying the second set of selectively activated features can include the network node deriving selectively activated features needed by the device to use the network service from a model-specific and/or a device-specific list of licensable selectively activated features maintained by the authorization server.

In an aspect, the method can further include verifying that the device holds a private key that corresponds to a public key of the device included with the proof of authority for the device, where sending the response to the request can be further based on a result of the verifying.

In some aspects, the method may further include receiving integrity information of the device. In such aspects, the response to the request may be further based on determining whether the integrity information is acceptable. According to some aspects, the device capability profile may include device integrity information created during a secure boot process, an authenticated boot process, or a secure and authenticated boot process. In one example, the device integrity information may prove the integrity of an authorization circuit/function/module of the device.

In some aspects, the proof of authority for the device may have originated (e.g., first been obtained, first been derived) at an authorization server, a local authorization server, or an authorization server and a local authorization server. The authorization server and the local authorization server may be different from an authorization, authentication, and accounting (AAA) server. The authorization server and the local authorization server may be different from a home subscriber server (HSS).

According to some aspects, the proof of authority for the device to use a first set of selectively activated features at the device, includes, for each of the selectively activated features, a date upon which authorization to activate the selectively activated feature will expire.

In one aspect, the proof of authority for the device to use the first set of selectively activated features at the device may be obtained by the network node from the device at a suitable time. As one example, the proof of authority for the device may be obtained from the device when the device attaches to a network. As another example, the proof of authority for the device may be obtained from an authorization server or a local authorization server during a feature activation process.

In one example, the proof of authority for the device to use a first set of selectively activated features at the device, may be sent to a home subscriber server (HSS). In some implementations, the authorization status of a selectively activated feature of a device (e.g., status indicative of whether the selectively activated feature is authorized and activated) may be sent to the HSS. The proof of authority for the device, the authorization status of selectively activated features of the device, or the proof of authority for the device and the authorization status of selectively activated features of the device may be used to update a capability profile of the device, where the capability profile can be stored at the HSS.

In an aspect, obtaining the capability profile of the device from the HSS may permit the network node (e.g., eNB, MME, S-GW, P-GW) to validate the authorization of a device to use a selectively activated feature without a need for the network node to obtain another form of proof may obviate a need for the network node to obtain, from the device, proof of authority for the device to use a first set of selectively activated features at the device).

In some implementations, the network node can create and/or change a device context (e.g., a UE context) based on the capability profile of the device. According to some aspects, the HSS may send an information element identifying selectively activated features authorized to be activated at the device. In an aspect, the information element can include the capability profile of the device. The HSS may send the information element to the network node. According to some aspects, the network node may activate and/or deactivate selectively activated features based on changes to the capability profile of the device stored at the HSS. The selectively activated features may be selectively activated features of the network node. The activation and/or deactivation of selectively activated features based on changes to the capability profile of the device stored at the HSS may facilitate creating and/or changing the device context (e.g., a UE context).

FIG. 19 is a flowchart of another exemplary method 1900 operational at a network node (e.g., network access node, eNB, MME, S-GW, P-GW) in accordance with aspects described herein. In one aspect, the network node may be similar to the exemplary device 1500 of FIG. 15. The network node can obtain a request, from a device, to use a network service 1902. The network node can also obtain proof of authority for the device to use a first set of selectively activated features at the device, signed by an authorization server 1904.

The network node may validate the proof of authority for the device 1906. In some aspects, the proof of authority for the device may be validated by validating an authorization certificate. In some aspects, where an authorization server issued the authorization certificate, the authorization certificate may be validated using a public key of the authorization server. In some aspects, where a local authorization server issued the authorization certificate, the authorization certificate may be validated using a public key of the local authorization server.

The network node may also verify that the device (that sent the proof of authority for the device) holds a private key that corresponds to a public key of the device included with the proof of authority 1908. In this way, the network node can verify that the device that sent the proof of authority is the device identified in the proof of authority. In some aspects, verifying that the device holds the private key that corresponds to the public key of the device included with the proof of authority, can involve validating a signature of the device (made by the device with the private key of the device), using the public key of the device included with the proof of authority.

The network node may determine if validation of the proof of authority for the device and verification of the device were successful 1910. If the network node determines that the validation of the proof of authority tot the device, verification of the device, or both validation of the proof of authority for the device and verification of the device were not successful, the network node may ignore the request to use the network service or may send a response denying the request to use the network service 1912.

If the network node determines that both validation of the proof of authority for the device and verification of the device were successful, the network node may identify features needed by the device to use the network service 1914. In one example, the network node may make the identification independently.

A listing of a first set of selectively activated features authorized to be activated at the device can be obtained from the proof of authority for the device. The network node may compare selectively activated features listed in the proof of authority to the identified features needed by the device to use the network service 1916.

A determination may be made as to whether the selectively activated features included n the proof of authority for the device match the features identified by the network node 1918. A response based on the determination may then be sent. When the features match, the network node may send a response granting the request to use the network service 1920. When the features do not match, the network node may either ignore the request to use the network service or may send a response denying the request to use the network service 1922.

Exemplary Home Subscriber Server (HSS)

FIG. 20 is a block diagram illustrating an exemplary home subscriber server (HSS) 2000 configured to support verification and enforcement of authorization agreements in accordance with aspects described herein. In one example, the exemplary HSS 2000 may include a network communication circuit 2002, a processing circuit 2004, and a memory circuit/storage device (referred to herein as memory circuit 2006). The network communication circuit 2002, processing circuit 2004, and memory circuit 2006 may be coupled to a communication bus 2008 for exchange of data and instructions.

The network communication circuit 2002 may include a first input/output circuit/function/module 2010 for input/output operations. Other circuits/functions/modules may be included with the network communication circuit 2002 as will be appreciated by those of skill in the art.

The processing circuit 2004 may be configured to include or implement one or more processors, application specific processors, hardware and/or software modules, etc., that are configured to support validation and/or enforcement of authorization agreements. The processing circuit 2004 may be configured to include an HSS operations circuit/function/module 2012 to implement the functionality of the HSS. The processing circuit 2004 may also be configured to include an authorization function circuit/function module 2014. Other circuits/functions/modules may be included with the processing circuit 2004 as will be appreciated by those of skill in the art.

The memory circuit 2006 may be configured to include storage space to store subscriptions profiles 2016 and capability profiles 2017, for a plurality of devices. The memory circuit 2006 may also be configured to include HSS operation instructions 2018 and authorization circuit/function/ module instructions, referred to herein as authorization instructions 2020. Other instructions and locations for storage of data may be included in the memory circuit 2006 as will be appreciated by those of skill in the art.

Communication between network communication circuit 2002, processing circuit 2004, memory circuit 2006, and other components (not shown) of the exemplary HSS 2000 may be through a communication bus 2008 or the like.

Exemplary Method Operational at Home Subscriber Server

FIG. 21 illustrates an exemplary method 2100 operational at a server (e.g., an HSS), which is related to validating the authorization for use of a set of one or more selectively activated features of a device (e.g., chip component, client device, network node) according to aspects described herein. The server may be similar to the exemplary HSS 2000 of FIG. 20.

In the exemplary method 2100, the server (e.g., HSS) may obtain a first list of selectively activated features of a device 2102 (e.g., an obtained capability profile of the device).

Information concerning a change to an authorization status of the device may be considered as information regarding a change to the capabilities of the device. The information concerning the change to the authorization status of the device may relate to a change to the authorization status of at least one selectively activated feature in a set of selectively activated features of the device.

The serve (e.g., HSS) can update a second list of selectively activated features of the device, stored at the server (e.g., HSS), based on the first list 2104. The second list may be referred to as a stored capability profile of the device. According to an aspect, the second list, stored at the server (e.g., HSS), can be associated with a subscription profile of the device. The update to the second list of selectively activated features of the device, stored at the HSS, may reflect a change to an authorization status of at least one selectively activated feature in the second list.

In one aspect, the first list of selectively activated features can originate at an authorization server and can be signed with a private key of the authorization server. According to such an aspect, the method may also include validating the first list of selectively activated features using a public key of the authorization server.

The server (e.g., HSS) may obtain a query concerning the capability of the device. The server (e.g., HSS), according to an aspect described herein, may send, responsive to the query concerning capability of the device, a capability profile including the second list of selectively activated features of the device 2106.

According to one example, an HSS may obtain a query concerning capability of the device during an initial attach procedure. The query may be obtained from an MME. The HSS may send, responsive to the query, the capability profile including the second list to the MME. The capability profile may be associated with the subscription profile of the device.

Alternatively, the HSS may obtain request for a specific element of information stored at the HSS. The element of information may relate to a capability of the device. The element of information may relate to one or more selectively activated features identified in the second list of selectively activated features of the device (e.g., in the stored capability profile of the device).

Using the example of the initial attach procedure, the HSS may send the capability profile of the first device (e.g., chip component, client device) to a second device (e.g., MME), so that the second device (e.g., MME) can configure various feature(s) to implement or compliment the selectively activated features already authorized/activated on the first device.

The second device (e.g., MME) may validate the right of the first device to use one or more selectively activated features without a need for the second device (e.g., MME) to obtain proof of authority for the first device to use a first set of selectively activated features at the first device, signed by a first authorization server (e.g., authorization information in the form of an authorization certificate) from the first device. The proof of authority for the first device may be needed by the second device (e.g., MME) to validate the right of the first device to use the set of selectively activated features. In the alternate aspect, the proof may be obtained by the second device (e.g., MME) from the HSS and configured to the network without input from the first device. Accordingly, and for example, the use of a capability profile, and/or an element of information that may relate to a capability of the device, which may be obtained from the HSS using, for example, an enhanced access network query protocol or a service query protocol, may facilitate/speed-up/improve efficiency of an MME in validating and enforcing an authorization agreement.

Specific implementations shown and described are only examples and should not be construed as the only way to implement the present disclosure unless specified otherwise herein. It is readily apparent to one of ordinary skill in the art that the various examples in the present disclosure may be practiced by numerous other solutions.

One or more of the components, acts, features and/or functions described herein and illustrated in the drawings may be rearranged and/or combined into a single component, act, feature, or function or included in several components, acts, features, or functions. Additional elements, components, acts, and/or functions may also be added without departing from the disclosure. Algorithms described herein may also be efficiently implemented in software and/or embedded in hardware.

In the description, elements, circuits, functions, and modules may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. For the most part, details concerning timing considerations and the like have been omitted where such details are not necessary to obtain a complete understanding of the present disclosure and are within the abilities of persons of ordinary skill in the relevant art.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would appreciate that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, the designations may be used herein as a convenient method of distinguishing between two or more elements or instances of an element. Thus, a reference to first and second elements does not mean that only two elements may be employed there or that the first element should precede the second element in some manner. In addition, unless stated otherwise, a set of elements may comprise one or more elements. Furthermore, it should be understood that words used in the singular include the plural and words used in the plural include the singular.

Moreover, a storage medium may represent one or more devices for storing including read-only memory (ROM), random access memory (RAM), magnetic disk storage mediums, optical storage mediums, flash memory devices and/or other machine-readable mediums, processor-readable mediums, processing circuit readable mediums, and/or computer-readable mediums for storing information. The terms "machine-readable medium," "processor-readable medium," "processing circuit readable medium", and/or "computer-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a machine-readable medium, processor-readable medium, processing circuit readable medium, and/or computer-readable medium and executed by one or more processors, processing circuits, machines, and/or devices.

Furthermore, aspects may be implemented by hardware, software, firmware, middleware, microcode, or any combination thereof. When implemented in software, firmware, middleware, or microcode, the program code or code segments to perform the tasks may be stored in a machine-readable medium such as a storage medium or other storage(s). A processing circuit may perform the tasks. A code segment may represent a process, a procedure, a function, a subprogram, a program, a routine, a subroutine, a module, a software package, a class, or any combination of instructions, data structures, or program statements. A code segment may be coupled to another code segment or a hardware circuit by passing, forwarding, or transmitting information, data, arguments, parameters, or memory contents. Information, data, arguments, parameters, or memory contents, etc. may be passed, forwarded, or transmitted via any suitable means including memory sharing, message passing, token passing, network transmission, etc.

The various illustrative logical blocks, elements, circuits, modules, functions, and/or components described in connection with the examples disclosed herein may be implemented or performed with a general-purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the general-purpose processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special-purpose processor for carrying out such aspects. Similarly, a general-purpose computer is considered a special-purpose computer when configured for carrying out aspects described herein.

The methods or algorithms described in connection with the examples disclosed herein may be included directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium appreciated by those of skill in the art. A storage medium may be coupled to the processor such that the processor can read information from, and write information to, the storage medium. In the alternative, the storage medium may be integral to the processor.

Those of skill in the art would further appreciate that the various illustrative logical blocks, circuits, functions, modules, and algorithms described in connection with the examples described herein may be implemented as electronic hardware, computer software, or combinations of both. To clearly illustrate this interchangeability of hardware and software, various illustrative elements, components, blocks, circuits, functions, modules, and algorithms have been described above generally in terms of their functionality. Whether such functionality is implemented as hardware, software, or a combination thereof depends upon the particular application and design selections imposed on the overall system.

The various features of the disclosure described herein can be implemented in different systems without departing from the disclosure. It should be noted that the foregoing aspects are merely examples and are not to be construed as limiting the disclosure. The descriptions of examples of the teachings of the disclosure are intended to be illustrative, and not to limit the scope of the claims. As such, the present teachings can be readily applied to other types of apparatuses and many alternatives, modifications, and variations will be apparent to those skilled in the art.

What is claimed is:

1. A method, comprising:
obtaining, at a device, from a network node, a listing of a first set of features offered by the network node to provide a network service;
sending, to the network node, a request to use the network service;
sending, to the network node, a request for a proof of authority for the network node to provide the network service;
obtaining, from the network node, the proof of authority for the network node to provide the network service, including a listing of a second set of features authorized to be activated at the network node, signed by an authorization server;
validating the proof of authority for the network node;
confirming that the first set of features offered by the network node to provide the network service is included in the second set of features authorized to be activated at the network node, to confirm that the network node is validly authorized to use the second set of features to provide the network service;
identifying, by the device, a listing of a third set of features needed by the network node to provide the network service; and
using the network service based on determining whether the third set of features needed by the network node to provide the network service is included in the second set of features authorized to be activated at the network node.

2. The method of claim 1, wherein the device is a chip component, a client device, a network access node, a mobility management entity, or a gateway device.

3. The method of claim 1, wherein the device is a client device or a chip component, and the network node is a network access node.

4. The method of claim 1, further comprising:
obtaining a proof of authority for the device to use a first set of selectively activated features at the device, signed by a first authorization server, wherein the first set of selectively activated features includes first selectively activated features used by the device to use the network service, the proof of authority for the device originates at the first authorization server, is signed with a private key of the first authorization server, and includes a listing of the first set of selectively activated features at the device;
validating the proof of authority for the device by validating the listing of the first set of selectively activated features at the device using a public key of the first authorization server;
obtaining feature activation keys associated with the first selectively activated features, encrypted with a public key of the device;
decrypting the feature activation keys, using a private key of the device, known only to the device; and
activating and/or maintaining activation of the first selectively activated features with the feature activation keys.

5. The method of claim 1, wherein the proof of authority for the network node originates at the authorization server, is signed with a private key of the authorization server, the method further comprising:
validating the proof of authority for the network node by validating the listing of the second set of features authorized to be activated at the network node using a public key of the authorization server.

6. The method of claim 4, wherein the first authorization server is a local authorization server.

7. The method of claim 1, wherein:
a proof of authority for the device to use a first set of selectively activated features at the device, including first selectively activated features used by the device to use the network service, originates at a first authorization server and is obtained, at the device, from the first authorization server; and
the proof of authority for the network node originates at the authorization server and is obtained, at the device, from the network node.

8. The method of claim 7, wherein the first authorization server and the authorization server are one authorization server.

9. The method of claim 7, wherein the proof of authority for the device is obtained from the first authorization server during a feature activation process, during which the device obtains authorization to activate the first selectively activated features at the device.

10. The method of claim 7, wherein the proof of authority for the device is data representative of an authorization certificate.

11. The method of claim 7, wherein the proof of authority for the device is data representative of an authorization agreement indicating that the device is authorized to activate the first set of selectively activated features at the device.

12. A device, comprising:
a network communication circuit; and
a processing circuit coupled to the network communication circuit, the processing circuit configured to:
obtain from a network node, a listing of a first set of features offered by the network node to provide a network service;
send, to the network node, a request to use the network service;
send, to the network node, a request for a proof of authority for the network node to provide the network service;
obtain, from the network node, the proof of authority for the network node to provide the network service, including a listing of a second set of features authorized to be activated at the network node, signed by an authorization server;
validate the proof of authority for the network node;
confirm that the first set of features offered by the network node to provide the network service is included in the second set of features authorized to be activated at the network node, to confirm that the network node is validly authorized to use the second set of features to provide the network service;
identify a listing of a third set of features needed by the network node to provide the network service; and
use the network service based on determining whether the third set of features needed by the network node to provide the network service is included in the second set of features authorized to be activated at the network node.

13. The device of claim 12, wherein the device is a chip component, a client device, a network access node, a mobility management entity, or a gateway device.

14. The device of claim 12, wherein the processing circuit is further configured to:
obtain a proof of authority for the device to use a first set of selectively activated features at the device, signed by a first authorization server, wherein the first set of selectively activated features at the device includes first selectively activated features used by the device to use the network service, the proof of authority for the device originates at the first authorization server, is signed with a private key of the first authorization server, and includes a listing of the first set of selectively activated features of the device;
validate the proof of authority for the device by validating the listing of the first set of selectively activated features of the device using a public key of the first authorization server;
obtain feature activation keys associated with the first selectively activated features, encrypted with a public key of the device;
decrypt the feature activation keys, using a private key of the device, known only to the device; and
activate and/or maintain activation of the first selectively activated features with the feature activation keys.

15. The device of claim 12, wherein the proof of authority for the network node originates at the authorization server, is signed with a private key of the authorization server, wherein the processing circuit is further configured to:
validate the proof of authority for the network node by validating the listing of the second set of features authorized to be activated at the network node using a public key of the authorization server.

16. The device of claim 14, wherein the first authorization server is a local authorization server.

17. The device of claim 12, wherein the processing circuit is further configured to:
  obtain, at the device, a proof of authority for the device to use a first set of selectively activated features at the device, signed by a first authorization server, wherein the proof of authority for the device originates at the first authorization server; and
  obtain, at the device, the proof of authority for the network node from the network node, wherein the proof of authority for the network node originates at the authorization server.

18. The device of claim 17, wherein the first authorization server and the authorization server are one authorization server.

19. The device of claim 17, wherein the processing circuit is further configured to obtain the proof of authority for the device from the first authorization server during a feature activation process, during which the device obtains authorization to activate the first set of selectively activated features at the device.

20. The device of claim 17, wherein the proof of authority for the device is data representative of an authorization certificate.

21. The device of claim 17, wherein the proof of authority for the device is data representative of an authorization agreement indicating that the device is authorized to activate the first set of selectively activated features at the device.

22. A method, comprising:
  offering, by a network node to a device, a listing of a first set of features offered by the network node to provide a network service to the device;
  obtaining a request, from the device, to use the network service;
  obtaining a request for a proof of authority for the network node to provide the network service;
  sending, to the device, the proof of authority for the network node to provide the network service, including a listing of a second set of features authorized to be activated at the network node, signed by a first authorization server, to permit confirmation that the network node is validly authorized to provide the network service by confirming that the first set of features offered by the network node to provide the network service is included in the second set of features authorized to be activated at the network node;
  obtaining a proof of authority for the device, including a listing of a first set of selectively activated features authorized to be activated at the device, signed by a second authorization server;
  validating the proof of authority for the device;
  identifying a listing of a third set of selectively activated features needed by the device to use the network service; and
  sending a response to the request to use the network service based on results of validating the proof of authority for the device and determining whether the third set of selectively activated features needed by the device to use the network service is included in the first set of selectively activated features authorized to be activated at the device.

23. The method of claim 22, wherein the network node is a network access node, a mobility management entity, or a gateway device.

24. The method of claim 22, wherein:
  the proof of authority for the device originates at the second authorization server, and the listing of the first set of selectively activated features authorized to be activated at the device is signed with a private key of the second authorization server; and the method further comprising:
    validating the proof of authority for the device by validating the listing of the first set of selectively activated features authorized to be activated at the device using a public key of the second authorization server.

25. The method of claim 22, wherein the proof of authority for the device originates at the second authorization server and is obtained, at the network node, from the device.

26. The method of claim 22, wherein the proof of authority for the device originates at the second authorization server and is obtained, at the network node, in a form of a capability profile of the device, from a home subscriber server (HSS).

27. The method of claim 22, wherein the proof of authority for the device is data representative of an authorization certificate.

28. The method of claim 22, wherein the proof of authority for the device is data representative of an authorization agreement indicating that the device is authorized to activate the first set of selectively activated features authorized to be activated at the device.

29. The method of claim 22, wherein identifying the third set of selectively activated features comprises:
  deriving the listing of the third set of selectively activated features needed by the device to use the network service from a model-specific and/or a device-specific list of authorized selectively activated features maintained by the second authorization server.

30. The method of claim 22, wherein identifying the third set of selectively activated features comprises:
  deriving the listing of the third set of selectively activated features needed by the device to use the network service from a model-specific and/or a device-specific list of licensable selectively activated features maintained by the second authorization server.

31. The method of claim 22, further comprising:
  verifying that the device holds a private key that corresponds to a public key of the device included with the proof of authority for the device, wherein sending the response to the request to use the network service is further based on a result of the verifying.

32. A network node, comprising:
  a network communication circuit; and
  a processing circuit coupled to the network communication circuit, the processing circuit configured to:
    send, to a device, a listing of a first set of features offered by the network node to provide a network service to the device;
    obtain a request, from the device, to use the network service;
    obtain a request for a proof of authority for the network node to provide the network service;
    send, to the device, the proof of authority for the network node to provide the network service, including a listing of a second set of features authorized to be activated at the network node, signed by a first authorization server, to permit confirmation that the network node is validly authorized to provide the network service by confirming that the first set of features offered by the network node to provide the network service is included in the second set of features authorized to be activated at the network node;

obtain a proof of authority for the device, including a listing of a first set of selectively activated features authorized to be activated at the device, signed by a second authorization server;

validate the proof of authority for the device;

identify a listing of a third set of selectively activated features needed by the device to use the network service; and send a response to the request to use the network service based on results of validating the proof of authority for the device and determining whether the third set of selectively activated features needed by the device to use the network service is included in the first set of selectively activated features authorized to be activated at the device.

33. The network node of claim 32, wherein the network node is a network access node, a mobility management entity, or a gateway device.

34. The network node of claim 32, wherein:

the proof of authority for the device originates at the second authorization server, and the listing of the first set of selectively activated features authorized to be activated at the device is signed with a private key of the second authorization server; and the processing circuit is further configured to:

validate the proof of authority for the device by validating the listing of the first set of selectively activated features authorized to be activated at the device using a public key of the second authorization server.

35. The network node of claim 32, wherein:

the proof of authority for the device originates at the second authorization server and the processing circuit is further configured to:

obtain the proof of authority for the device, at the network node, from the device.

36. The network node of claim 32, wherein when identifying the third set of selectively activated features, the processing circuit is further configured to:

derive the listing of the third set of selectively activated features needed by the device to use the network service from a model-specific and/or a device-specific list of authorized selectively activated features maintained by the second authorization server.

37. The network node of claim 32, wherein when identifying the third set of selectively activated features, the processing circuit is further configured to:

derive the listing of the third set of selectively activated features needed by the device to use the network service from a model-specific and/or a device-specific list of licensable selectively activated features maintained by the authorization server.

* * * * *